United States Patent
Bai et al.

(10) Patent No.: US 12,401,406 B2
(45) Date of Patent: Aug. 26, 2025

(54) CONTROL SIGNALING FOR BEAM UPDATE AND REFERENCE SIGNALS

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 255 days.

(21) Appl. No.: 17/118,503

(22) Filed: Dec. 10, 2020

(65) Prior Publication Data

US 2022/0191850 A1    Jun. 16, 2022

(51) Int. Cl.
*H04W 72/044* (2023.01)
*H04W 16/28* (2009.01)
*H04W 72/02* (2009.01)

(52) U.S. Cl.
CPC ......... *H04W 72/046* (2013.01); *H04W 16/28* (2013.01); *H04W 72/02* (2013.01)

(58) Field of Classification Search
CPC .... H04W 72/046; H04W 16/28; H04W 72/02
See application file for complete search history.

(56) References Cited

U.S. PATENT DOCUMENTS

| | | | | |
|---|---|---|---|---|
| 2013/0065541 A1* | 3/2013 | Lum | ................... | H04W 16/14 455/77 |
| 2017/0047976 A1* | 2/2017 | Noh | ................... | H04B 7/0695 |
| 2017/0302341 A1* | 10/2017 | Yu | ................... | H04B 7/0695 |
| 2017/0331670 A1* | 11/2017 | Parkvall | ............... | H04W 52/028 |
| 2018/0091212 A1* | 3/2018 | Lee | ................... | H04B 7/0695 |
| 2018/0234959 A1* | 8/2018 | Ahn | ................... | H04W 72/20 |
| 2018/0242300 A1* | 8/2018 | Hakola | ................ | H04L 5/0048 |
| 2018/0269947 A1* | 9/2018 | Levitsky | .............. | H04B 7/0695 |
| 2019/0052331 A1* | 2/2019 | Chang | ................... | H04B 7/08 |
| 2019/0058629 A1* | 2/2019 | Akoum | ................. | H04B 7/088 |
| 2019/0069285 A1* | 2/2019 | Chandrasekhar | ..... | H04W 72/23 |
| 2019/0254078 A1* | 8/2019 | Zhang | ............... | H04W 74/0833 |
| 2019/0356371 A1* | 11/2019 | Osawa | ................. | H04B 7/0695 |

(Continued)

FOREIGN PATENT DOCUMENTS

WO   WO-2018059339 A1 *   4/2018   .......... H04B 7/0695

OTHER PUBLICATIONS

3GPP TSG RAN WG1 #103-e, R1-2009141, Enhancements on Multi-beam Operation, Spreadtrum Communications, =e-Meeting, Oct. 26-Nov. 13, 2020.*

(Continued)

*Primary Examiner* — Jamaal Henson
(74) *Attorney, Agent, or Firm* — Holland & Hart LLP

(57) ABSTRACT

Methods, systems, and devices for wireless communications are described. A user equipment (UE) may receive, from a base station, a control message including a first indication for updating a beam for communicating with the base station to a first beam and a second indication for configuring a set of reference signals for measuring the first beam. The UE may measure the first beam using the reference signals. The UE may communicate with the base station based on the beam measurement. The control message may include a format for jointly indicating beam updates and reference signal configurations.

24 Claims, 15 Drawing Sheets

(56) References Cited

U.S. PATENT DOCUMENTS

| | | | |
|---|---|---|---|
| 2020/0106498 A1 | 4/2020 | Zhou et al. | |
| 2020/0162289 A1* | 5/2020 | Ahn | H04L 5/0053 |
| 2020/0213978 A1* | 7/2020 | Iyer | H04L 1/1812 |
| 2020/0288421 A1* | 9/2020 | Kim | H04W 56/0015 |
| 2021/0185646 A1 | 6/2021 | Zhou et al. | |
| 2021/0320838 A1* | 10/2021 | Lee | H04L 5/0048 |
| 2021/0360550 A1* | 11/2021 | Ying | H04W 24/10 |
| 2022/0022266 A1* | 1/2022 | Agiwal | H04W 76/28 |
| 2022/0149922 A1* | 5/2022 | Wang | H04B 7/0626 |

OTHER PUBLICATIONS

International Search Report and Written Opinion—PCT/US2021/072091—ISA/EPO—Mar. 1, 2022.
Spreadtrum Communications: "Enhancements on Multi-Beam Operation", 3GPP TSG RAN WG1 #103-e, 3GPP Draft, R1-2009141, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, 8 p. Oct. 24, 2020 (Oct. 24, 2020), XP051946857, Retrieved from the Internet: URL: https://ftp.3qpp.org/tsg_ran/WG1_RL1/TSGR1_103-e/Docs/R1-2009141.zip R1-2009141 Enhancements on Multi-beam Operation.docx [retrieved on Oct. 24, 2020] Sections 2.1-2.3, p. 4-p. 6.

* cited by examiner

CONTROL SIGNALING FOR BEAM UPDATE AND REFERENCE SIGNALS

FIELD OF TECHNOLOGY

The following relates to wireless communications, including control signaling for beam update and reference signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems may support beam updates for communication between a UE and a base station.

SUMMARY

The described techniques relate to improved methods, systems, devices, and apparatuses that support control signaling for beam update and reference signals. Generally, the described techniques provide for control signaling for beam updates.

A method for wireless communication at a user equipment (UE) is described. The method may include receiving, from a base station, a control message including a first indication for updating a beam for communicating with the base station to a first beam and a second indication for configuring a set of reference signals for measuring the first beam, measuring the first beam using the set of reference signals, and communicating with the base station using the first beam based on the measuring.

An apparatus for wireless communication at a UE is described. The apparatus may include a processor, memory in electronic communication with the processor, and instructions stored in the memory. The instructions may be executable by the processor to cause the apparatus to receive, from a base station, a control message including a first indication for updating a beam for communicating with the base station to a first beam and a second indication for configuring a set of reference signals for measuring the first beam, measure the first beam using the set of reference signals, and communicate with the base station using the first beam based on the measuring.

Another apparatus for wireless communication at a UE is described. The apparatus may include means for receiving, from a base station, a control message including a first indication for updating a beam for communicating with the base station to a first beam and a second indication for configuring a set of reference signals for measuring the first beam, means for measuring the first beam using the set of reference signals, and means for communicating with the base station using the first beam based on the measuring.

A non-transitory computer-readable medium storing code for wireless communication at a UE is described. The code may include instructions executable by a processor to receive, from a base station, a control message including a first indication for updating a beam for communicating with the base station to a first beam and a second indication for configuring a set of reference signals for measuring the first beam, measure the first beam using the set of reference signals, and communicate with the base station using the first beam based on the measuring.

In some examples of the method, apparatuses, and non-transitory computer-readable medium described herein, receiving the control message may include operations, features, means, or instructions for identifying a format of the control message for jointly indicating updating the beam and configuring the set of reference signals.

In some examples of the method, apparatuses, and non-transitory computer-readable medium described herein, receiving the control message may include operations, features, means, or instructions for identifying a format of the control message for scheduling uplink or downlink communications, and where at least a portion of the control message may be configured for jointly indicating updating the beam and configuring the set of reference signals.

Some examples of the method, apparatuses, and non-transitory computer-readable medium described herein may further include operations, features, means, or instructions for determining a set of resources used for communicating the set of reference signals based on the second indication.

In some examples of the method, apparatuses, and non-transitory computer-readable medium described herein, the set of resources used for communicating the set of reference signals may be non-synchronized with a set of raster resources associated with an initial access procedure between the UE and the base station.

In some examples of the method, apparatuses, and non-transitory computer-readable medium described herein, the set of resources used for communicating the set of reference signals may be synchronized with a set of raster resources associated with an initial access procedure between the UE and the base station.

Some examples of the method, apparatuses, and non-transitory computer-readable medium described herein may further include operations, features, means, or instructions for determining, based on the second indication, a duration between a transmission of a feedback message by the UE in response to the control message and a transmission of the set of reference signals by the base station.

Some examples of the method, apparatuses, and non-transitory computer-readable medium described herein may further include operations, features, means, or instructions for determining, based on the second indication, a duration for communicating using the first beam with respect to the set of reference signals, where communicating with the base station using the first beam may be based on the duration.

In some examples of the method, apparatuses, and non-transitory computer-readable medium described herein, the set of reference signals includes a set of synchronization signal blocks (SSBs), a set of channel state information (CSI) reference signals (CSI-RSs), a set of tracking reference signals, or a combination thereof.

In some examples of the method, apparatuses, and non-transitory computer-readable medium described herein, the control message includes a downlink control information (DCI) message.

In some examples of the method, apparatuses, and non-transitory computer-readable medium described herein, the control message includes a media access control (MAC) control element (MAC-CE).

A method for wireless communication at a base station is described. The method may include transmitting, to a UE, a control message including a first indication for updating a beam for communicating with the UE to a first beam and a second indication for configuring a set of reference signals for the UE measuring the first beam, transmitting the set of reference signals based on the second indication, and communicating with the UE using the first beam.

An apparatus for wireless communication at a base station is described. The apparatus may include a processor, memory in electronic communication with the processor, and instructions stored in the memory. The instructions may be executable by the processor to cause the apparatus to transmit, to a UE, a control message including a first indication for updating a beam for communicating with the UE to a first beam and a second indication for configuring a set of reference signals for the UE measuring the first beam, transmit the set of reference signals based on the second indication, and communicate with the UE using the first beam.

Another apparatus for wireless communication at a base station is described. The apparatus may include means for transmitting, to a UE, a control message including a first indication for updating a beam for communicating with the UE to a first beam and a second indication for configuring a set of reference signals for the UE measuring the first beam, means for transmitting the set of reference signals based on the second indication, and means for communicating with the UE using the first beam.

A non-transitory computer-readable medium storing code for wireless communication at a base station is described. The code may include instructions executable by a processor to transmit, to a UE, a control message including a first indication for updating a beam for communicating with the UE to a first beam and a second indication for configuring a set of reference signals for the UE measuring the first beam, transmit the set of reference signals based on the second indication, and communicate with the UE using the first beam.

In some examples of the method, apparatuses, and non-transitory computer-readable medium described herein, transmitting the control message may include operations, features, means, or instructions for identifying a format of the control message for jointly indicating updating the beam and configuring the set of reference signals.

In some examples of the method, apparatuses, and non-transitory computer-readable medium described herein, transmitting the control message may include operations, features, means, or instructions for identifying a format of the control message for scheduling uplink or downlink communications, and where at least a portion of the control message may be configured for jointly indicating updating the beam and configuring the set of reference signals.

Some examples of the method, apparatuses, and non-transitory computer-readable medium described herein may further include operations, features, means, or instructions for determining a set of resources used for communicating the set of reference signals based on the second indication.

In some examples of the method, apparatuses, and non-transitory computer-readable medium described herein, the set of resources used for communicating the set of reference signals may be non-synchronized with a set of raster resources associated with an initial access procedure between the UE and the base station.

In some examples of the method, apparatuses, and non-transitory computer-readable medium described herein, the set of resources used for communicating the set of reference signals may be synchronized with a set of raster resources associated with an initial access procedure between the UE and the base station.

Some examples of the method, apparatuses, and non-transitory computer-readable medium described herein may further include operations, features, means, or instructions for determining, based on the second indication, a duration between a transmission of a feedback message by the UE in response to the control message and a transmission of the set of reference signals by the base station.

Some examples of the method, apparatuses, and non-transitory computer-readable medium described herein may further include operations, features, means, or instructions for determining, based on the second indication, a duration for communicating using the first beam with respect to the set of reference signals, where communicating with the UE using the first beam may be based on the duration.

In some examples of the method, apparatuses, and non-transitory computer-readable medium described herein, the set of reference signals includes a set of SSBs, a set of CSI-RSs, a set of tracking reference signals, or a combination thereof.

In some examples of the method, apparatuses, and non-transitory computer-readable medium described herein, the control message includes a DCI message.

In some examples of the method, apparatuses, and non-transitory computer-readable medium described herein, the control message includes a MAC-CE.

DETAILED DESCRIPTION

Figure 1:
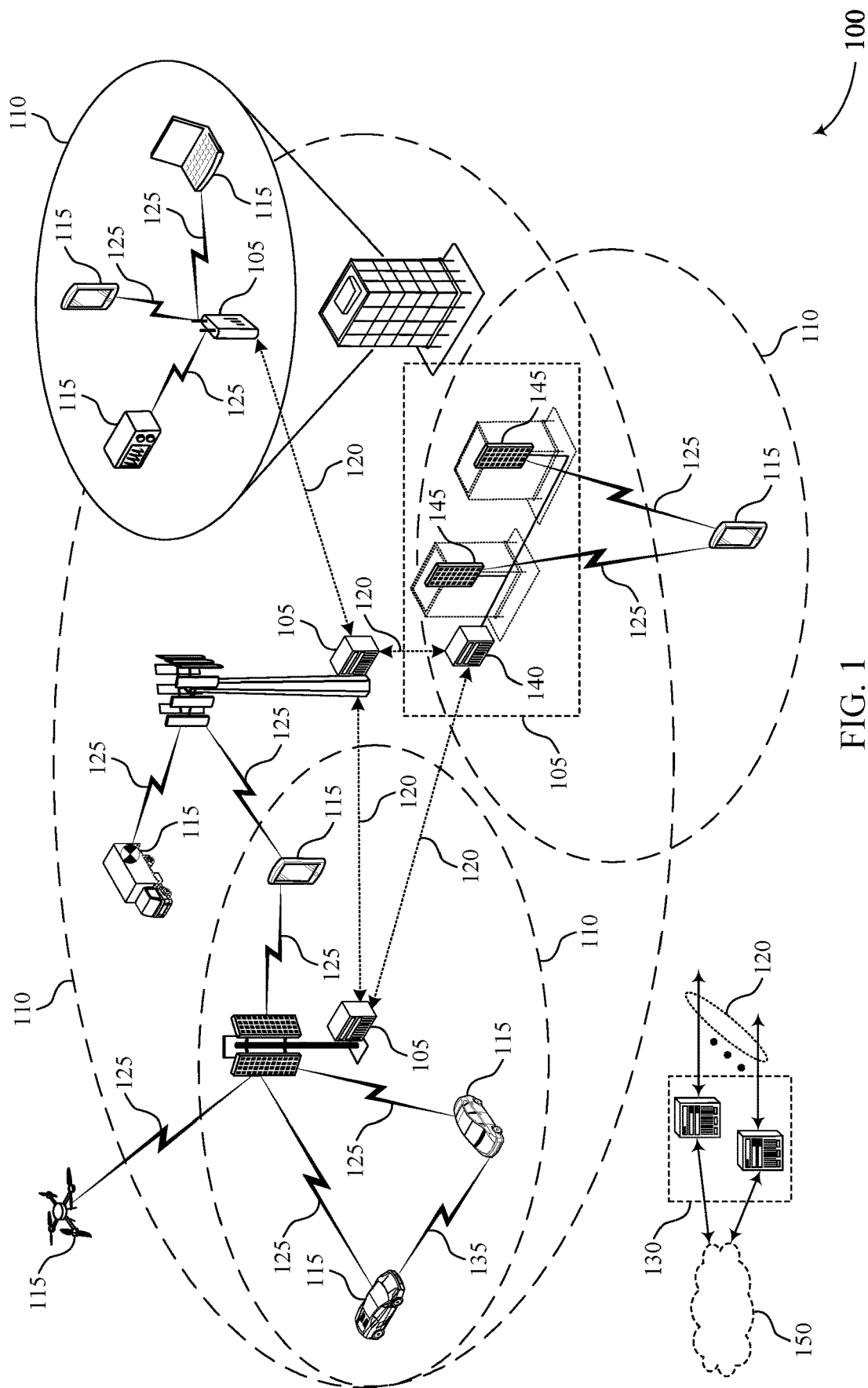
FIG. 1 illustrates an example of a wireless communications system that supports control signaling for beam update and reference signals in accordance with aspects of the present disclosure.

A base station may transmit a control message to a user equipment (UE) to dynamically indicate a beam update for communications between the base station and the UE over a channel (e.g., a physical downlink control channel (PDCCH), a physical downlink shared channel (PDSCH)). For example, the base station may indicate the beam update in a control message such as a downlink control information (DCI) message (e.g., in a transmission configuration indication (TCI) field of the DCI message) or a media access control (MAC) control element (MAC-CE).

However, for cases where the new beam has not previously been tracked by the UE, the base station may transmit additional signaling (e.g., an RRC message) to the UE to indicate reference signals for tracking the new beam. Accordingly, indicating the beam update and the reference signals over different signaling messages may increase processing overhead and latency for establishing communications using the new beam. For example, delay between the UE receiving the indication of the beam update and the indication of the reference signals may increase delay (e.g., also referred to herein as a warmup time) associated with the UE for synchronizing with the new beam.

According to examples of aspects described herein, techniques are described for providing, over a single control message, an indication of a beam update for communication between a UE and a base station over a beam and an indication for configuring reference signals for measuring or synchronizing with the beam. In an example, a UE may receive, from a base station, a control message including a first indication for updating a beam for communicating with the base station to a first beam and a second indication for configuring a set of reference signals for measuring the first beam. The UE may measure the first beam using the reference signals. In an example, the UE may communicate with the base station based on the beam measurement.

The UE may identify a format of the control message. In an example, the control message may include a format for jointly indicating beam updates and reference signal configurations. The control message may be in a DCI format. For example, the control message may include a DCI message. In some aspects, the control message may include a scheduling format for scheduling uplink and downlink communications, and the indication of the beam updates and reference signal configurations may be included in a portion (e.g., fields) of the control message that is configured for jointly indicating beam updates and reference signal configurations. In another example, the control message may include a MAC-CE.

The UE may determine, from the control message (e.g., from the second indication in the control message), resources for communicating the reference signals. For example, the control message (e.g., the second indication in the control message) may indicate the resources for communicating the reference signals. The resources may include time and frequency resources which are non-synchronized with raster resources associated with an initial access procedure between the UE and the base station. In another example, the resources may include time and frequency resources which are synchronized with the raster resources. In some aspects, the reference signals may include a set of synchronization signal blocks (SSBs). In some other aspects, the reference signals may include a set of channel state information (CSI) reference signals (CSI-RSs). In some aspects, the reference signals may include a set of tracking reference signals.

Aspects of the subject matter described herein may be implemented to realize one or more advantages. The described techniques may support improvements in spectral efficiency and reliability, among other advantages. In some aspects, by providing, over a single control message, an indication of a beam update and an indication for configuring reference signals for measuring or synchronizing with a beam indicated in the beam update, processing overhead, signaling overhead, and latency for establishing communications using the new beam may be reduced. For example, the described techniques may reduce the delay (e.g., also referred to herein as a warmup time) associated with the UE for synchronizing with the beam indicated in the beam update.

Aspects of the disclosure are initially described in the context of wireless communications systems. Examples of processes and signaling exchanges that support control signaling for beam update and reference signals are then described. Aspects of the disclosure are further illustrated by and described with reference to apparatus diagrams, system diagrams, and flowcharts that relate to control signaling for beam update and reference signals.

FIG. 1 illustrates an example of a wireless communications system 100 that supports control signaling for beam update and reference signals in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

According to examples of aspects described herein, techniques are described for providing, over a single control message, an indication of a beam update for communication between a UE 115 and a base station 105 over a beam and an indication for configuring reference signals for measuring or synchronizing with the beam. In an example, a UE 115 may receive, from a base station 105, a control message including a first indication for updating a beam for communicating with the base station 105 to a first beam. The control message may include a second indication for configuring a set of reference signals for measuring the first beam. The UE 115 may measure the first beam using the reference signals. In an example, the UE 115 may communicate with the base station 105 based on the beam measurement.

The UE 115 may identify a format of the control message. In an example, the control message may include a format for jointly indicating beam updates and reference signal configurations. The control message may be in a DCI format. For example, the control message may include a DCI message. In some aspects, the control message may include a scheduling format for scheduling uplink and downlink communications, and the indication of the beam updates and reference signal configurations may be included in a portion (e.g., fields) of the control message that is configured for jointly indicating beam updates and reference signal configurations. In another example, the control message may include a MAC-CE.

The UE 115 may determine, from the control message (e.g., from the second indication in the control message), resources for communicating the reference signals. For example, the control message (e.g., the second indication in the control message) may indicate the resources for communicating the reference signals. The resources may include time and frequency resources which are non-synchronized with raster resources associated with an initial access procedure between the UE and the base station. In another example, the resources may include time and frequency resources which are synchronized with the raster resources. In some aspects, the reference signals may include a set of SSBs. In some other aspects, the reference signals may include a set of CSI-RSs. In some aspects, the reference signals may include a set of tracking reference signals.

Figure 2:
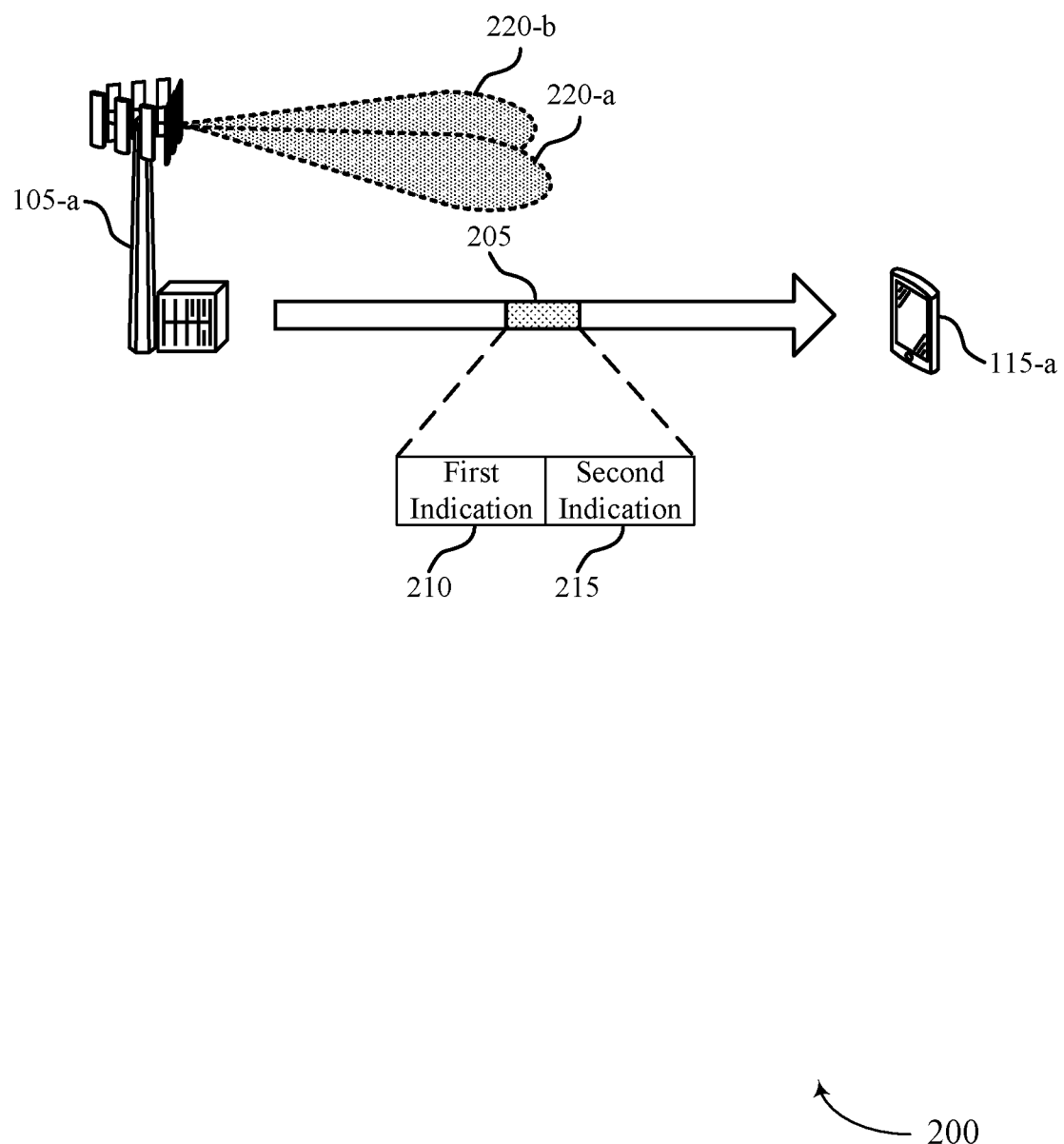
FIG. 2 illustrates an example of a wireless communications system that supports control signaling for beam update and reference signals in accordance with aspects of the present disclosure.

FIG. 2 illustrates an example of a wireless communications system 200 that supports control signaling for beam update and reference signals in accordance with aspects of the present disclosure. In some examples, wireless communications system 200 may implement aspects of wireless communication system 100 and may include a UE 115-a and a base station 105-a, which may be examples of a UE 115 and a base station 105, respectively, described with reference to FIG. 1.

As discussed with reference to FIG. 2, the UE 115-a may receive a control message 205 from the base station 105-a. The control message 205 may include a first indication 210 for updating a beam for communicating with the base station 105-a to a beam 220-a. For example, the first indication 210 may indicate an update from a beam 220-b to the beam 220-a. The control message 205 may include a second indication 215 for configuring a set of reference signals for measuring the beam 220-a. The UE 115-a may measure the beam 220-a using the reference signals. In an example, the UE 115-a may communicate with the base station 105-a based on the beam measurement.

In some aspects, the UE 115-a may identify a format of the control message 205. In an example, the control message 205 may include a format for jointly indicating beam updates and reference signal configurations. For example, the format of the control message 205 may be configured for or reserved for jointly indicating beam updates and associated reference signal configurations. The control message 205 may be in a DCI format. For example, the control message 205 may include a DCI message.

In some aspects, the control message 205 may include a format for scheduling uplink and downlink communications (e.g., a conventional downlink control message format), and the indication of the beam updates and reference signal configurations may be included in a portion (e.g., fields) of the control message 205, where the portion (e.g., fields) of the control message is configured for jointly indicating beam updates and reference signal configurations. For example, some of the bits of the control message 205 may be reused or repurposed for jointly indicating beam updates and associated reference signal configurations. In some examples, bits that are reserved in a downlink control information format may be used for this purpose. In another example, the control message 205 may include a MAC-CE.

In some aspects, the UE 115-a may determine, from the control message 205 (e.g., from the second indication 215 in the control message 205), resources for communicating the reference signals. For example, the control message 205 (e.g., the second indication 215 in the control message 205) may indicate the resources for communicating the reference signals. The resources may include time and frequency resources which are non-synchronized with raster resources (e.g., time and frequency resources) associated with an initial access procedure between the UE 115-a and the base station 105-a. That is, since the resources for the updated beam are indicated in the control message indicating the beam update, the resources for the reference signal can be different from preconfigured resources (e.g., a raster) that are reserved for initial access procedures, thereby providing additional flexibility in the configuration of reference signals. In another example, the resources may include time and frequency resources which are synchronized with the raster resources.

In some aspects, the resources for communicating the reference signals for the updated beam may be configured (e.g., preconfigured) by the base station 105-a. For example, the base station 105-a may configure (e.g., preconfigure) the resources based on a set of rules or parameters, and the UE 115-a may be configured (e.g., through control signaling or pre-configuration) with the rules used to configure the resources. In an example, the base station 105-a may configure a default set of resources for communicating the reference signals with each beam update (e.g., updating from the beam 220-b to the beam 220-a). In some examples, based on a control message 205 indicating a beam update, the UE 115-a may assume a default set of resources for receiving or measuring the reference signals for the updated beam.

In some aspects, the reference signals may include a set of SSBs. In some other aspects, the reference signals may include a set of CSI-RSs. In some examples, the CSI-RSs may be reference signals used for a UE beam refinement procedure (e.g., a P3 beam sweep procedure). In some aspects, the reference signals may include a set of tracking reference signals, which may provide for time and frequency tracking of the beam 220-a. In an example, the reference signals (e.g., SSBs, CSI-RSs, tracking reference signals) may serves as the quasi-collocation (QCL) source for the beam 220-a (e.g., the updated TCI state).

In some aspects, the UE 115-a may transmit a feedback message (e.g., an ACK) to the base station 105-a in response to receiving the control message 205. The base station 105-a may transmit the reference signals in response to the feedback message (e.g., ACK), for example, after a configured duration (e.g., a symbol duration). In an example, the second indication 215 may include an indication of the configured duration (e.g., symbol duration). For example, the UE 115-a may determine the configured duration (e.g., symbol duration) based on the second indication 215.

In some other aspects, the second indication 215 may include a duration for communicating using the beam 220-a with respect to the reference signals (e.g., SSBs, CSI-RSs, tracking reference signals). The duration may be, for example, an amount of time between the transmission of the reference signals and communication using the beam 220-a. The duration may be referred to as an action time indicating when the beam 220-a will be ready for use following the transmission of the reference signals (e.g., SSBs, CSI-RSs, tracking reference signals). In some examples, the action time may include a warmup time described herein for the UE 115-a to synchronize with the beam 220-a as indicated in the beam update.

Additionally, or alternatively, the base station 105-b may provide multiple control messages, where a first control message includes the first indication 210 of a beam update for communication between the UE 115-a and the base station 105-a over the beam 220-a and a second control message includes the second indication 215 for configuring reference signals for measuring or synchronizing with the beam 220-a. In an example, the base station 105-b may transmit the second control message after the UE 115-a transmits a feedback message (e.g., ACK) for the first control message. For example, the base station 105-b may transmit the second control message after receiving feedback message (e.g., ACK) for the first control message. In some aspects, the control messages may include DCI messages or MAC-CEs.

Figure 3:
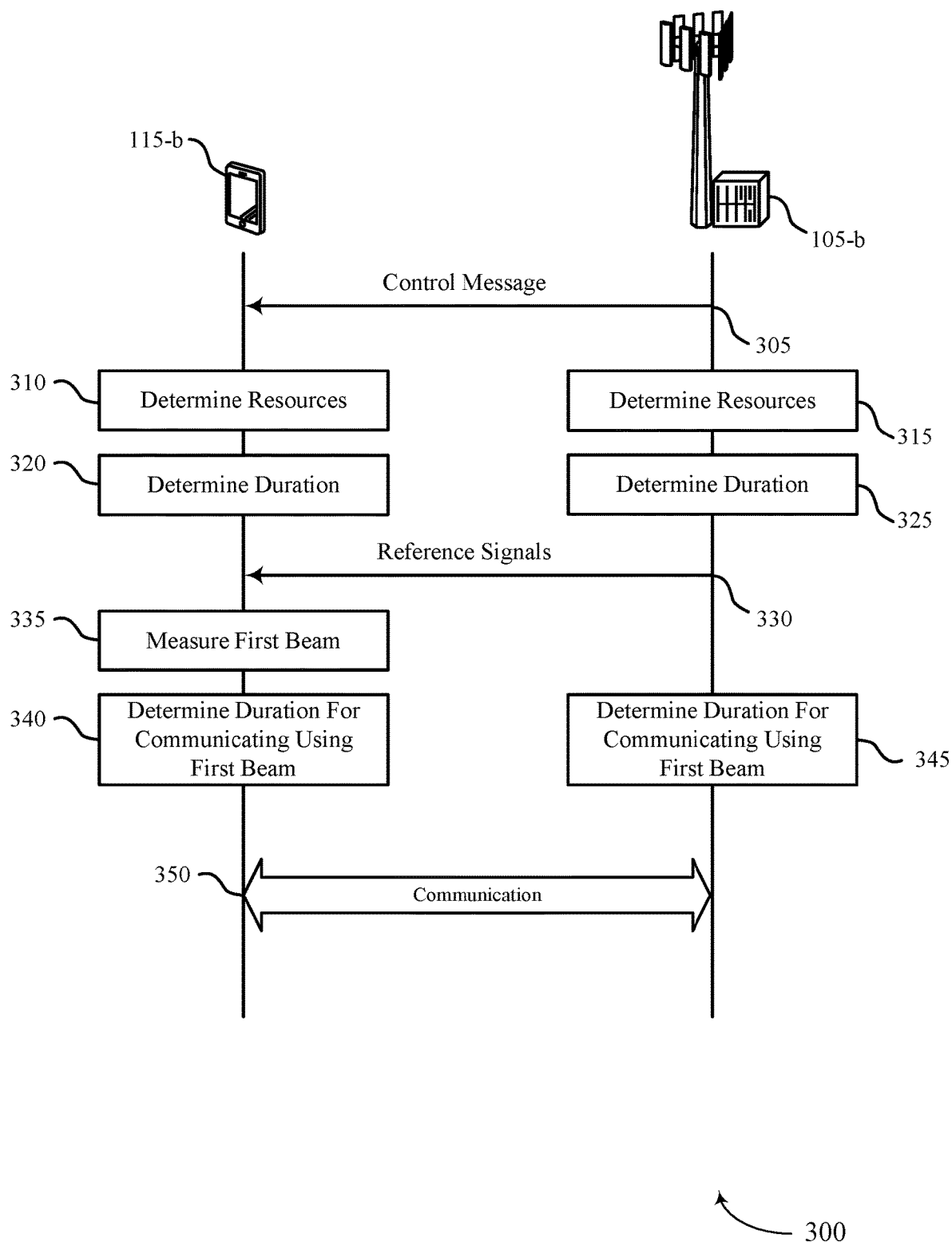
FIG. 3 illustrates an example of a process flow that supports control signaling for beam update and reference signals in accordance with aspects of the present disclosure.

FIG. 3 illustrates an example of a process flow 300 that supports control signaling for beam update and reference signals in accordance with aspects of the present disclosure. In some examples, process flow 300 may implement aspects of wireless communications systems 100 or 200. Further, process flow 300 may be implemented by a UE 115-b and a base station 105-b, which may be examples of a UE 115, a UE 115-a, a base station 105, and a base station 105-a described with reference to FIGS. 1 and 2.

In the following description of the process flow 300, the operations between UE 115-b and base station 105-b may be transmitted in a different order than the order shown, or the operations performed by base station 105-b and UE 115-b may be performed in different orders or at different times. Certain operations may also be left out of the process flow 300, or other operations may be added to the process flow 300. It is to be understood that while base station 105-b and UE 115-b are shown performing a number of the operations of process flow 300, any wireless device may perform the operations shown.

At 305, the UE 115-b may receive, from the base station 105-b, a control message including a first indication for updating a beam for communicating with the base station to a first beam and a second indication for configuring a set of reference signals for measuring the first beam. In some examples, receiving the control message may include identifying a format of the control message for jointly indicating updating the beam and configuring the set of reference signals. In some other examples, receiving the control message may include identifying a format of the control message for scheduling uplink or downlink communications, and at least a portion of the control message may be configured for jointly indicating updating the beam and configuring the set of reference signals.

In some examples, the base station 105-b transmitting the control message may include identifying a format of the control message for jointly indicating updating the beam and configuring the set of reference signals. In some other examples, the base station 105-b transmitting the control message may include identifying a format of the control message for scheduling uplink or downlink communications, and at least a portion of the control message may be configured for jointly indicating updating the beam and configuring the set of reference signals.

In some aspects, the set of reference signals may include a set of SSBs, a set of CSI-reference signals, a set of tracking reference signals, or a combination thereof. In some examples, the control message may include a DCI message. In some examples, the control message may include a media access control MAC-CE.

At 310, the UE 115-b may determine a set of resources used for communicating the set of reference signals based on the second indication. At 315, the base station 105-b may determine the set of resources used for communicating the set of reference signals based on the second indication. In some aspects, the set of resources used for communicating the set of reference signals may be non-synchronized with a set of raster resources associated with an initial access procedure between the UE and the base station. In some other aspects, the set of resources used for communicating the set of reference signals may be synchronized with a set of raster resources associated with an initial access procedure between the UE and the base station.

At 320, the UE 115-b may determine, based on the second indication, a duration between a transmission of a feedback message by the UE 115-b in response to the control message and a transmission of the set of reference signals by the base station 105-b. At 325, the base station 105-b may determine, based on the second indication, the duration between the transmission of the feedback message by the UE in response to the control message and the transmission of the set of reference signals by the base station.

At 330, the base station 105-b may transmit the set of reference signals based on the second indication.

At 335, the UE 115-b may measure the first beam using the set of reference signals.

At 340, the UE 115-b may determine, based on the second indication, a duration for communicating using the first beam with respect to the set of reference signals, where communicating with the base station 105-b using the first beam may be based on the duration.

At 345, the base station 105-b may determine, based on the second indication, the duration for communicating using the first beam with respect to the set of reference signals, where communicating with the UE 115-*b* using the first beam may be based on the duration.

At 350, the UE 115-*b* may communicate with the base station 105-*b* using the first beam based on the measuring.

Figure 4:
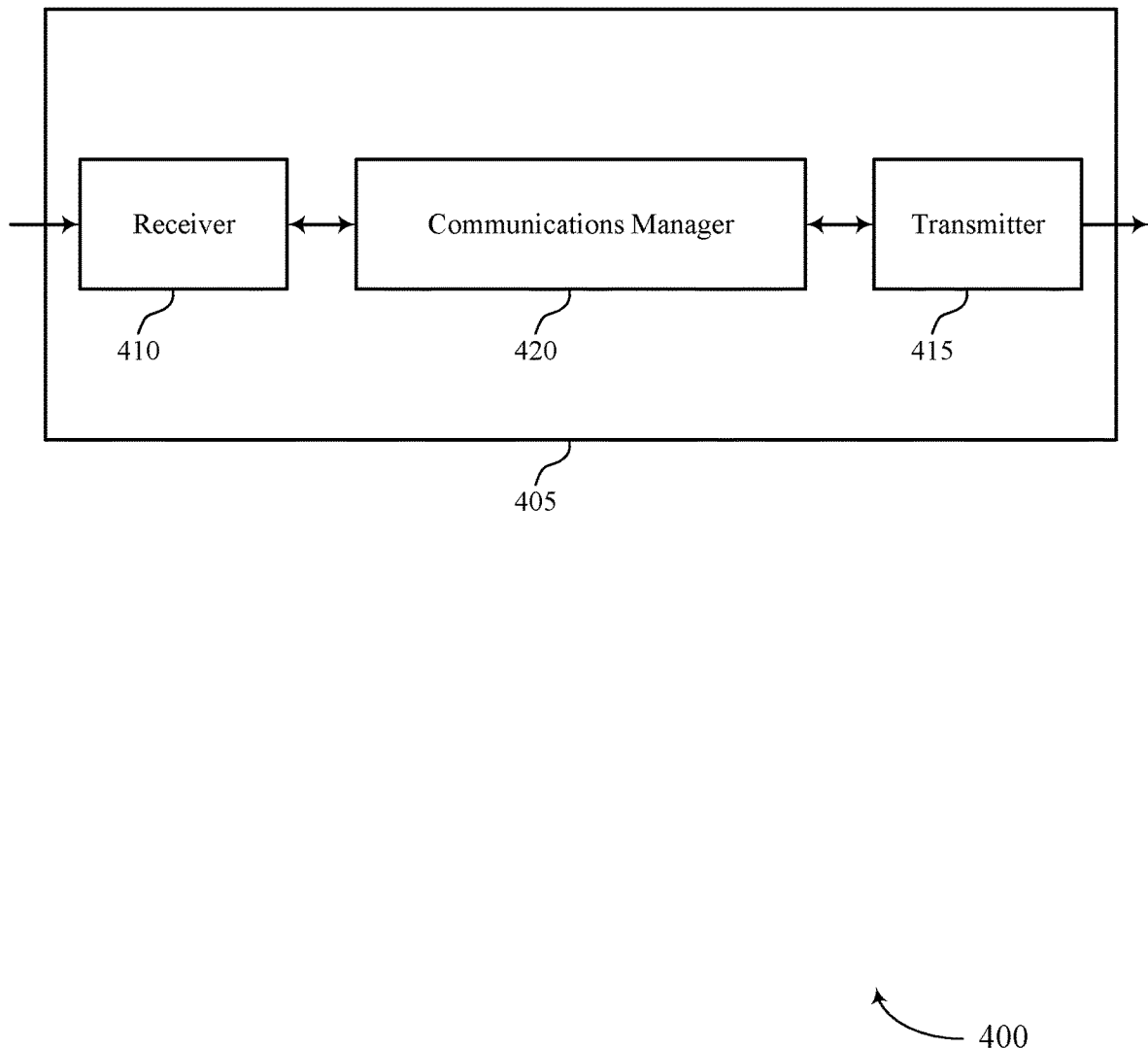
FIGS. 4 and 5 show block diagrams of devices that support control signaling for beam update and reference signals in accordance with aspects of the present disclosure.

FIG. 4 shows a block diagram 400 of a device 405 that supports control signaling for beam update and reference signals in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to control signaling for beam update and reference signals). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to control signaling for beam update and reference signals). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of control signaling for beam update and reference signals as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving, from a base station, a control message including a first indication for updating a beam for communicating with the base station to a first beam and a second indication for configuring a set of reference signals for measuring the first beam. The communications manager 420 may be configured as or otherwise support a means for measuring the first beam using the set of reference signals. The communications manager 420 may be configured as or otherwise support a means for communicating with the base station using the first beam based on the measuring.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reduced processing, reduced power consumption, and more efficient utilization of communication resources, among other advantages. One implementation may allow the device 405 to receive, in a single control message, an indication of a beam update and an indication for configuring reference signals for measuring or synchronizing with a beam indicated in the beam update, thereby reducing processing overhead and latency for establishing communications using the new beam. As such, the communications manager 420 may decrease signaling overhead for the device 405, thereby saving power and decreasing signaling complexity. For example, the described techniques may allow the device 405 to more efficiently synchronize with a beam indicated in a beam update, thereby reducing the delay (e.g., also referred to herein as a warmup time) associated with therewith.

Figure 5:
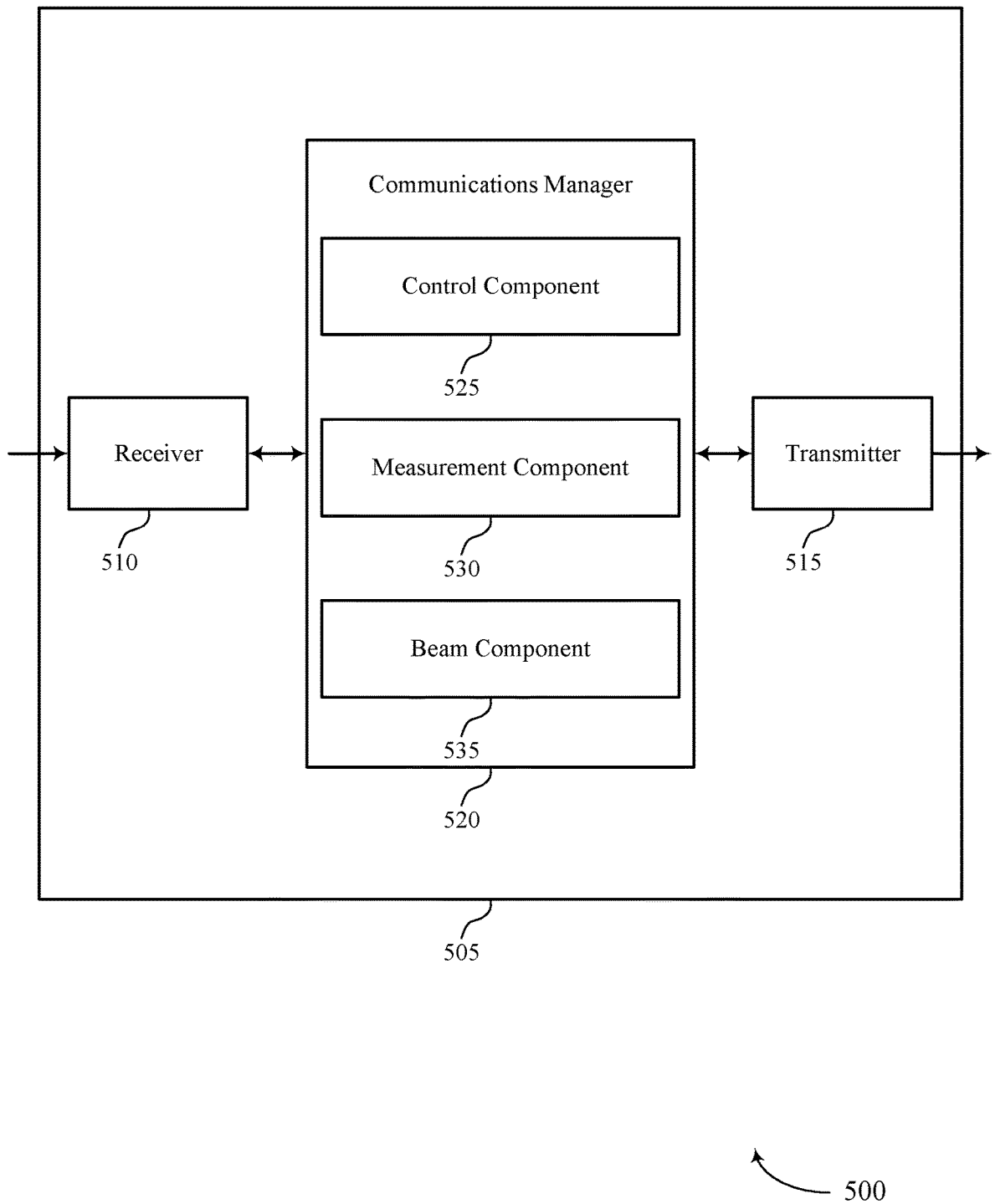

FIG. 5 shows a block diagram 500 of a device 505 that supports control signaling for beam update and reference signals in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to control signaling for beam update and reference signals). Information may be passed on to other components of the device 505. The receiver 510 may utilize a single antenna or a set of multiple antennas.

The transmitter 515 may provide a means for transmitting signals generated by other components of the device 505.

For example, the transmitter 515 may transmit information such as packets, user data, control information, or any combination thereof associated with various information channels (e.g., control channels, data channels, information channels related to control signaling for beam update and reference signals). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of control signaling for beam update and reference signals as described herein. For example, the communications manager 520 may include a control component 525, a measurement component 530, a beam component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The control component 525 may be configured as or otherwise support a means for receiving, from a base station, a control message including a first indication for updating a beam for communicating with the base station to a first beam and a second indication for configuring a set of reference signals for measuring the first beam. The measurement component 530 may be configured as or otherwise support a means for measuring the first beam using the set of reference signals. The beam component 535 may be configured as or otherwise support a means for communicating with the base station using the first beam based on the measuring.

Figure 6:
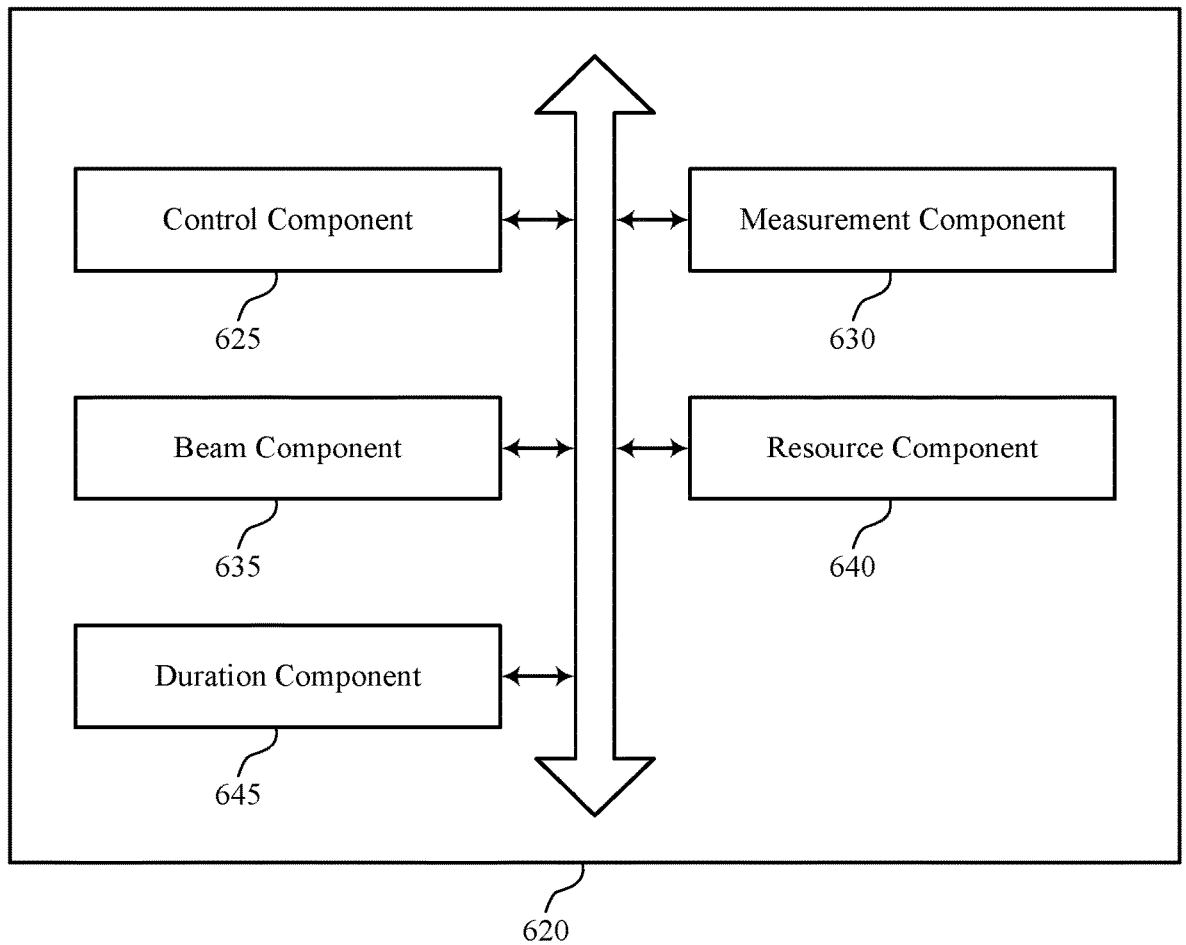
FIG. 6 shows a block diagram of a communications manager that supports control signaling for beam update and reference signals in accordance with aspects of the present disclosure.

FIG. 6 shows a block diagram 600 of a communications manager 620 that supports control signaling for beam update and reference signals in accordance with aspects of the present disclosure. The communications manager 620 may be an example of aspects of a communications manager 420, a communications manager 520, or both, as described herein. The communications manager 620, or various components thereof, may be an example of means for performing various aspects of control signaling for beam update and reference signals as described herein. For example, the communications manager 620 may include a control component 625, a measurement component 630, a beam component 635, a resource component 640, a duration component 645, or any combination thereof. Each of these components may communicate, directly or indirectly, with one another (e.g., via one or more buses).

The communications manager 620 may support wireless communication at a UE in accordance with examples as disclosed herein. The control component 625 may be configured as or otherwise support a means for receiving, from a base station, a control message including a first indication for updating a beam for communicating with the base station to a first beam and a second indication for configuring a set of reference signals for measuring the first beam. The measurement component 630 may be configured as or otherwise support a means for measuring the first beam using the set of reference signals. The beam component 635 may be configured as or otherwise support a means for communicating with the base station using the first beam based on the measuring.

In some examples, to support receiving the control message, the control component 625 may be configured as or otherwise support a means for identifying a format of the control message for jointly indicating updating the beam and configuring the set of reference signals.

In some examples, to support receiving the control message, the control component 625 may be configured as or otherwise support a means for identifying a format of the control message for scheduling uplink or downlink communications, and where at least a portion of the control message is configured for jointly indicating updating the beam and configuring the set of reference signals.

In some examples, the resource component 640 may be configured as or otherwise support a means for determining a set of resources used for communicating the set of reference signals based on the second indication. In some examples, the set of resources used for communicating the set of reference signals are non-synchronized with a set of raster resources associated with an initial access procedure between the UE and the base station. In some examples, the set of resources used for communicating the set of reference signals are synchronized with a set of raster resources associated with an initial access procedure between the UE and the base station.

In some examples, the duration component 645 may be configured as or otherwise support a means for determining, based on the second indication, a duration between a transmission of a feedback message by the UE in response to the control message and a transmission of the set of reference signals by the base station. In some examples, the duration component 645 may be configured as or otherwise support a means for determining, based on the second indication, a duration for communicating using the first beam with respect to the set of reference signals, where communicating with the base station using the first beam is based on the duration.

In some examples, the set of reference signals includes a set of SSBs, a set of CSI-reference signals, a set of tracking reference signals, or a combination thereof. In some examples, the control message includes a DCI message. In some examples, the control message includes a MAC-CE.

Figure 7:
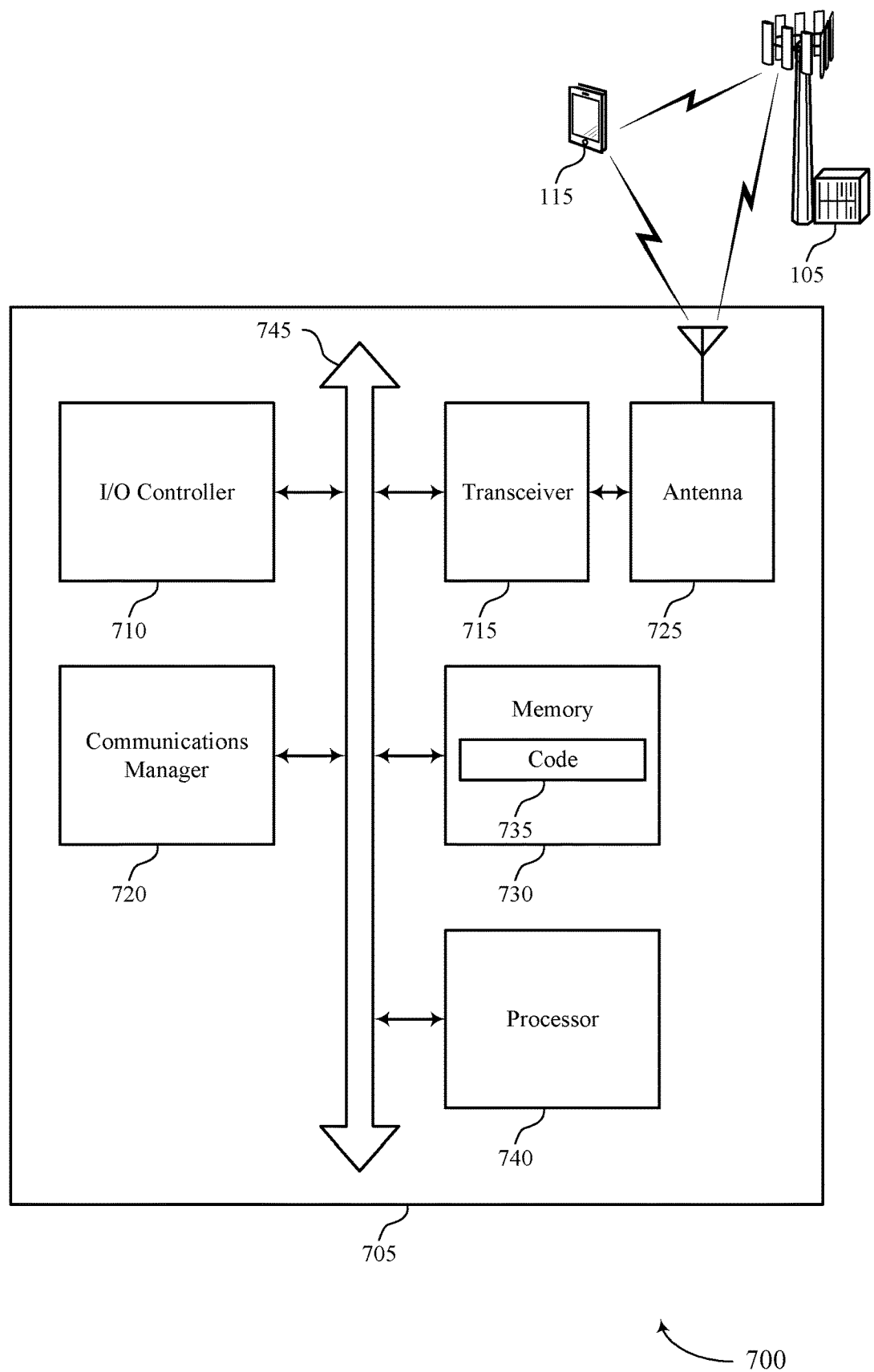
FIG. 7 shows a diagram of a system including a device that supports control signaling for beam update and reference signals in accordance with aspects of the present disclosure.

FIG. 7 shows a diagram of a system 700 including a device 705 that supports control signaling for beam update and reference signals in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting control signaling for beam update and reference signals). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving, from a base station, a control message including a first indication for updating a beam for communicating with the base station to a first beam and a second indication for configuring a set of reference signals for measuring the first beam. The communications manager 720 may be configured as or otherwise support a means for measuring the first beam using the set of reference signals. The communications manager 720 may be configured as or otherwise support a means for communicating with the base station using the first beam based on the measuring.

By including or configuring the communications manager 720 in accordance with examples as described herein, the device 705 may support techniques for reduced latency, improved user experience related to reduced processing, reduced power consumption, more efficient utilization of communication resources, improved coordination between devices, and longer battery life, among other advantages. One implementation may allow the device 705 to receive, in a single control message, an indication of a beam update and an indication for configuring reference signals for measuring or synchronizing with a beam indicated in the beam update, thereby reducing processing overhead and latency for establishing communications using the new beam. As such, the communications manager 720 may decrease signaling overhead for the device 705, thereby saving power and decreasing signaling complexity. For example, the described techniques may allow the device 705 to more efficiently synchronize with a beam indicated in a beam update, thereby reducing the delay (e.g., also referred to herein as a warmup time) associated with therewith.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of control signaling for beam update and reference signals as described herein, or the processor 740 and the memory 730 may be otherwise configured to perform or support such operations.

Figure 8:
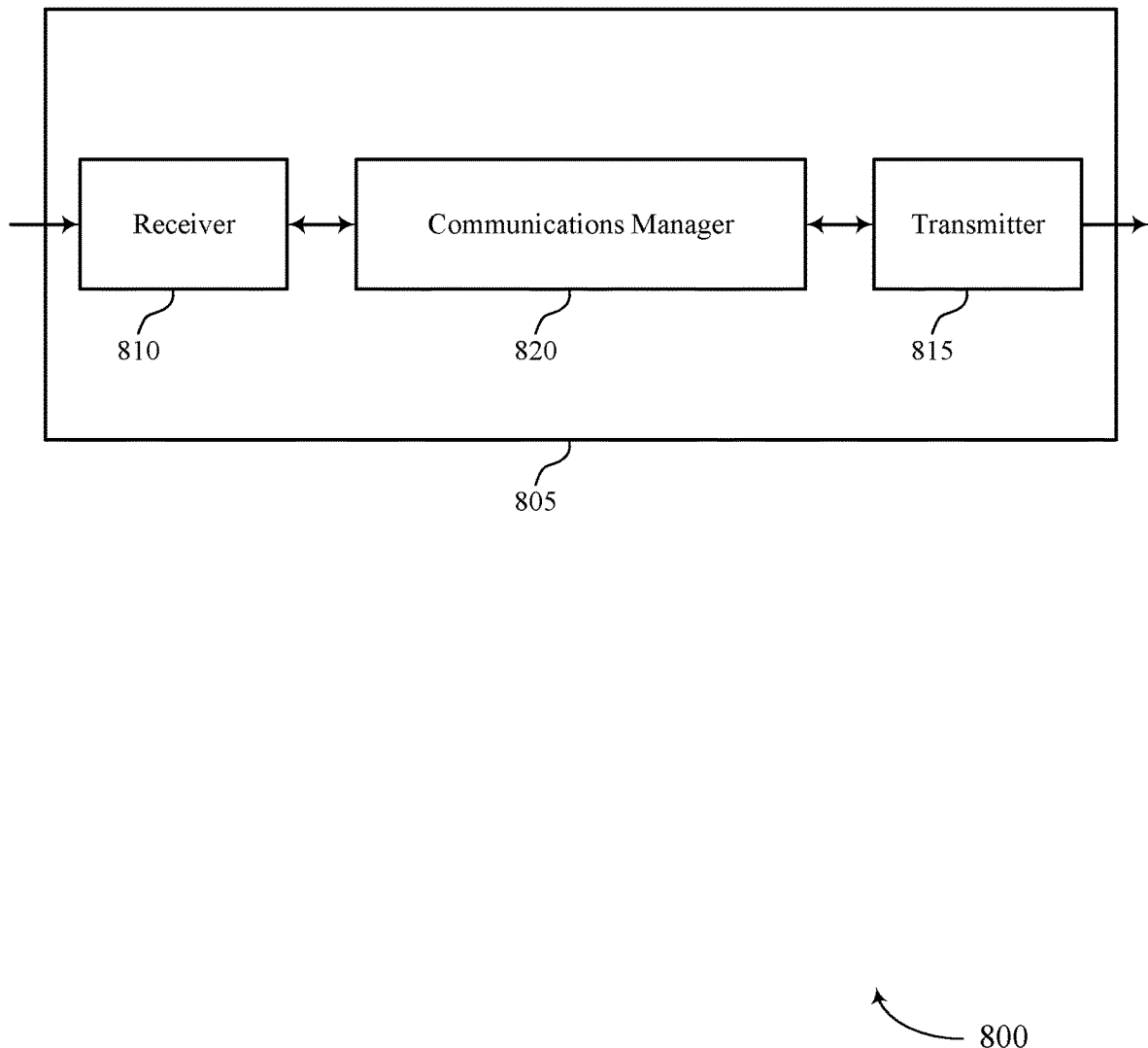
FIGS. 8 and 9 show block diagrams of devices that support control signaling for beam update and reference signals in accordance with aspects of the present disclosure.

FIG. 8 shows a block diagram 800 of a device 805 that supports control signaling for beam update and reference signals in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to control signaling for beam update and reference signals). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to control signaling for beam update and reference signals). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of control signaling for beam update and reference signals as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for transmitting, to a UE, a control message including a first indication for updating a beam for communicating with the UE to a first beam and a second indication for configuring a set of reference signals for the UE measuring the first beam. The communications manager 820 may be configured as or otherwise support a means for transmitting the set of reference signals based on the second indication. The communications manager 820 may be configured as or otherwise support a means for communicating with the UE using the first beam.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced processing, reduced power consumption, and more efficient utilization of communication resources, among other advantages. One implementation may allow the device 805 to transmit, in a single control message, an indication of a beam update and an indication for configuring reference signals for measuring or synchronizing with a beam indicated in the beam update, thereby reducing processing overhead and latency for establishing communications using the new beam. As such, the communications manager 820 may decrease signaling overhead for the device 805, thereby saving power and decreasing signaling complexity. For example, the described techniques may allow the device 805 to more efficiently indicate reference signals for synchronizing with a beam indicated in a beam update, thereby reducing the delay (e.g., also referred to herein as a warmup time) associated with therewith.

Figure 9:
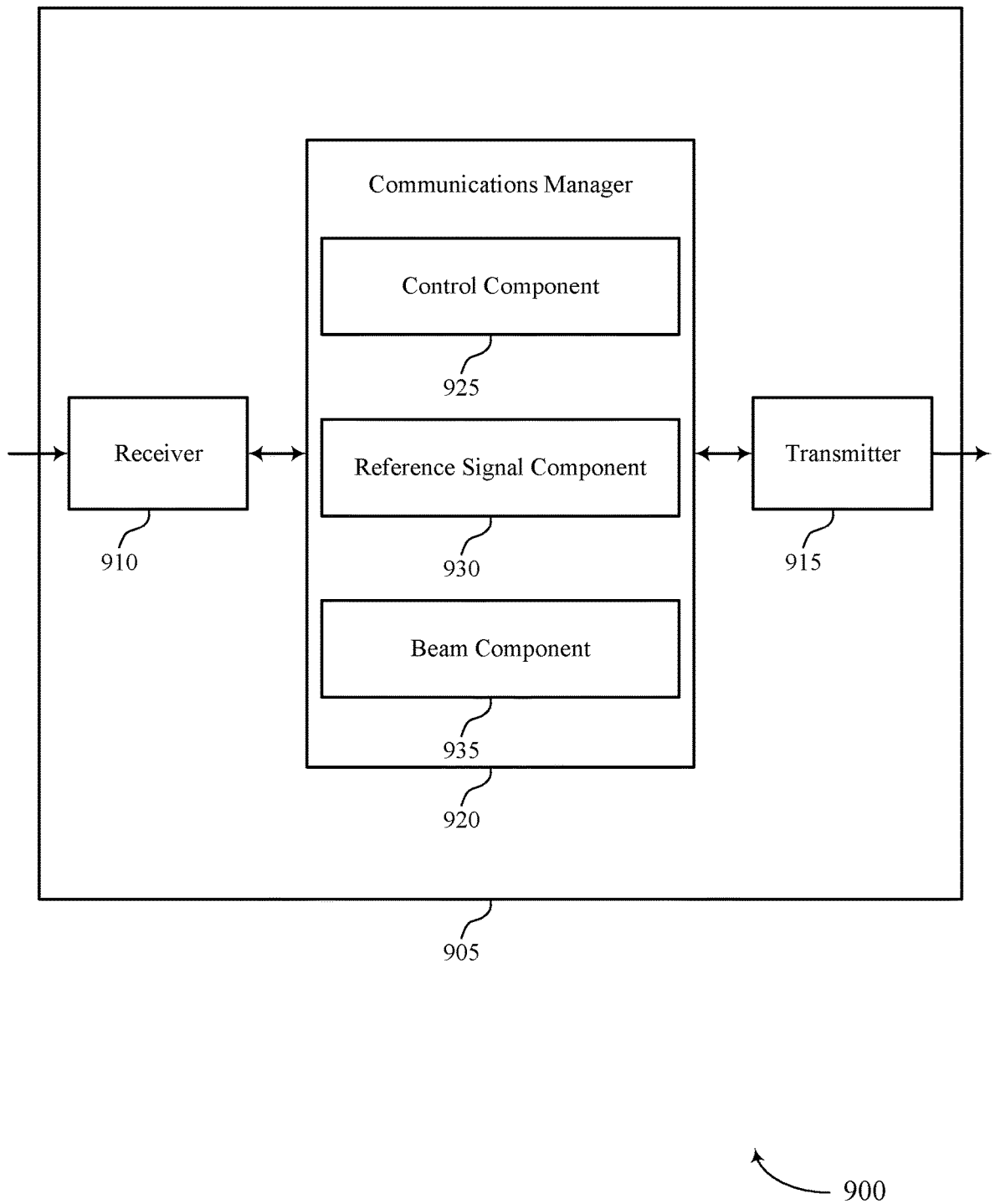

FIG. 9 shows a block diagram 900 of a device 905 that supports control signaling for beam update and reference signals in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to control signaling for beam update and reference signals). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to control signaling for beam update and reference signals). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of control signaling for beam update and reference signals as described herein. For example, the communications manager 920 may include a control component 925, a reference signal component 930, a beam component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The control component 925 may be configured as or otherwise support a means for transmitting, to a UE, a control message including a first indication for updating a beam for communicating with the UE to a first beam and a second indication for configuring a set of reference signals for the UE measuring the first beam. The reference signal component 930 may be configured as or otherwise support a means for transmitting the set of reference signals based on the second indication. The beam component 935 may be configured as or otherwise support a means for communicating with the UE using the first beam.

Figure 10:
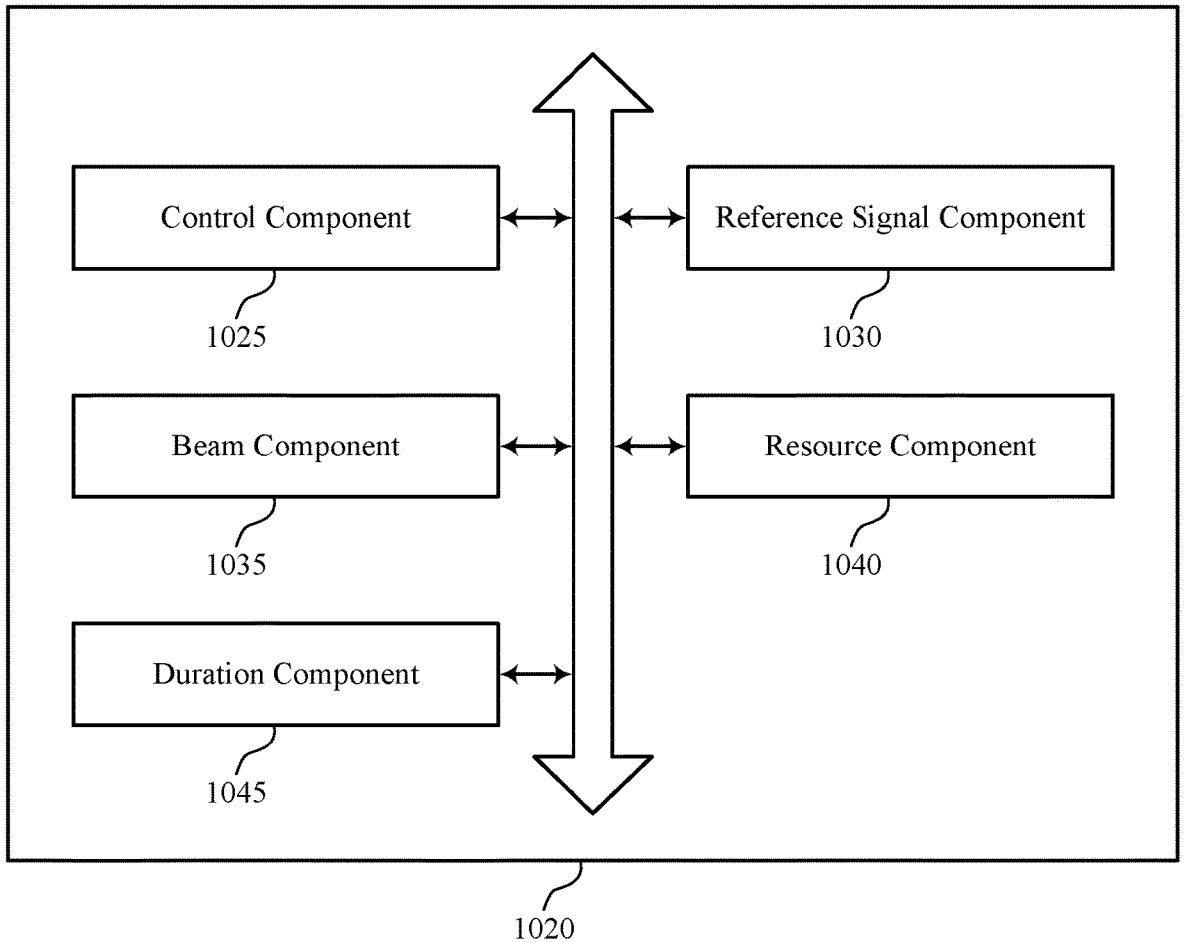
FIG. 10 shows a block diagram of a communications manager that supports control signaling for beam update and reference signals in accordance with aspects of the present disclosure.

FIG. 10 shows a block diagram 1000 of a communications manager 1020 that supports control signaling for beam update and reference signals in accordance with aspects of the present disclosure. The communications manager 1020 may be an example of aspects of a communications manager 820, a communications manager 920, or both, as described herein. The communications manager 1020, or various components thereof, may be an example of means for performing various aspects of control signaling for beam update and reference signals as described herein. For example, the communications manager 1020 may include a control component 1025, a reference signal component 1030, a beam component 1035, a resource component 1040, a duration component 1045, or any combination thereof. Each of these components may communicate, directly or indirectly, with one another (e.g., via one or more buses).

The communications manager 1020 may support wireless communication at a base station in accordance with examples as disclosed herein. The control component 1025 may be configured as or otherwise support a means for transmitting, to a UE, a control message including a first indication for updating a beam for communicating with the UE to a first beam and a second indication for configuring a set of reference signals for the UE measuring the first beam. The reference signal component 1030 may be configured as or otherwise support a means for transmitting the set of reference signals based on the second indication. The beam component 1035 may be configured as or otherwise support a means for communicating with the UE using the first beam.

In some examples, to support transmitting the control message, the control component 1025 may be configured as or otherwise support a means for identifying a format of the control message for jointly indicating updating the beam and configuring the set of reference signals. In some examples, to support transmitting the control message, the control component 1025 may be configured as or otherwise support a means for identifying a format of the control message for scheduling uplink or downlink communications, and where at least a portion of the control message is configured for jointly indicating updating the beam and configuring the set of reference signals.

In some examples, the resource component 1040 may be configured as or otherwise support a means for determining a set of resources used for communicating the set of reference signals based on the second indication. In some examples, the set of resources used for communicating the set of reference signals are non-synchronized with a set of raster resources associated with an initial access procedure between the UE and the base station. In some examples, the set of resources used for communicating the set of reference signals are synchronized with a set of raster resources associated with an initial access procedure between the UE and the base station.

In some examples, the duration component 1045 may be configured as or otherwise support a means for determining, based on the second indication, a duration between a transmission of a feedback message by the UE in response to the control message and a transmission of the set of reference signals by the base station. In some examples, the duration component 1045 may be configured as or otherwise support a means for determining, based on the second indication, a duration for communicating using the first beam with respect to the set of reference signals, where communicating with the UE using the first beam is based on the duration.

In some examples, the set of reference signals includes a set of SSBs, a set of CSI-reference signals, a set of tracking reference signals, or a combination thereof. In some examples, the control message includes a DCI message. In some examples, the control message includes a MAC-CE.

Figure 11:
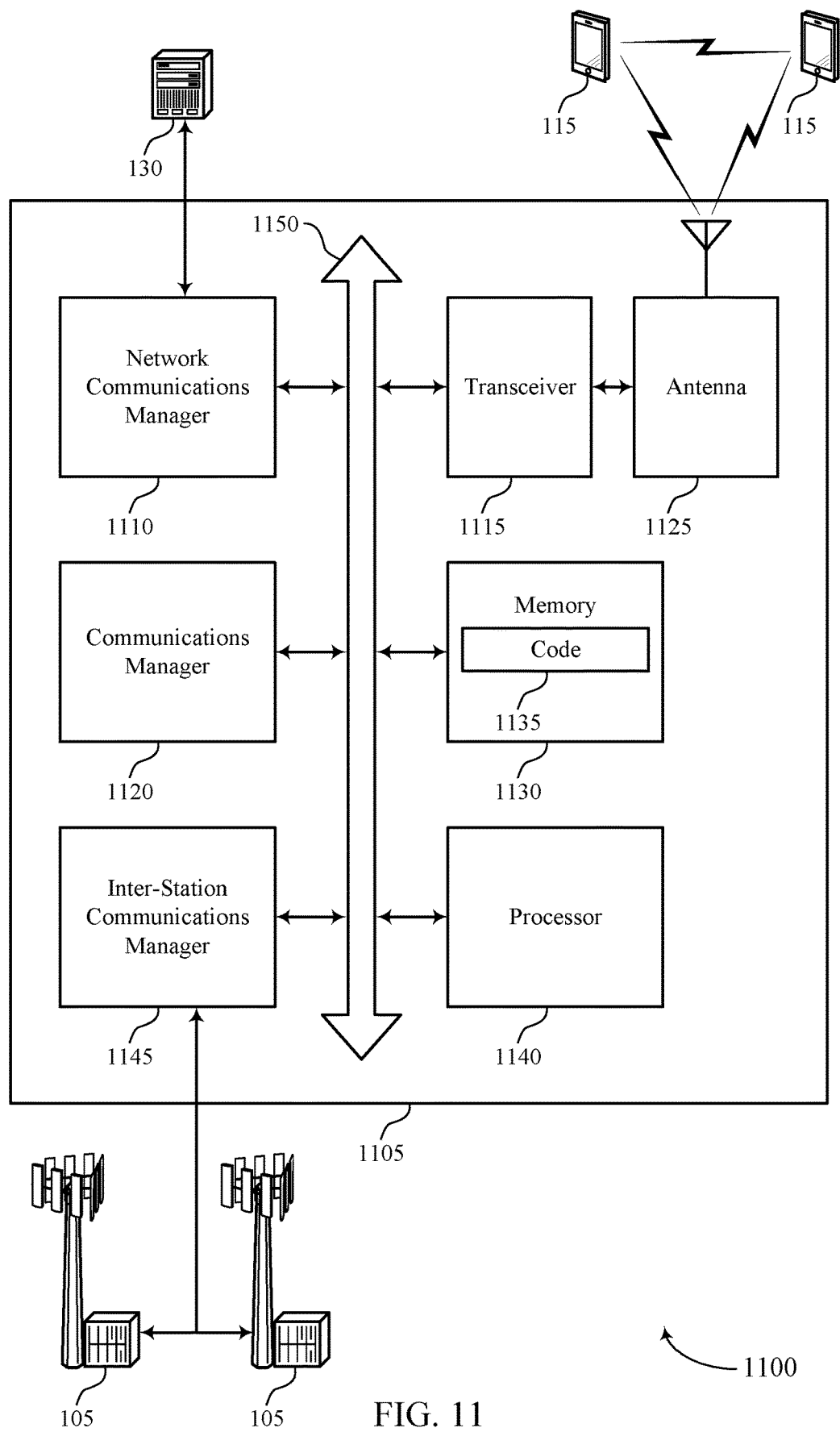
FIG. 11 shows a diagram of a system including a device that supports control signaling for beam update and reference signals in accordance with aspects of the present disclosure.

FIG. 11 shows a diagram of a system 1100 including a device 1105 that supports control signaling for beam update and reference signals in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting control signaling for beam update and reference signals). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for transmitting, to a UE, a control message including a first indication for updating a beam for communicating with the UE to a first beam and a second indication for configuring a set of reference signals for the UE measuring the first beam. The communications manager 1120 may be configured as or otherwise support a means for transmitting the set of reference signals based on the second indication. The communications manager 1120 may be configured as or otherwise support a means for communicating with the UE using the first beam.

By including or configuring the communications manager 1120 in accordance with examples as described herein, the device 1105 may support techniques for reduced latency, improved user experience related to reduced processing, reduced power consumption, more efficient utilization of communication resources, improved coordination between devices, longer battery life, and improved utilization of processing capability, among other advantages. One implementation may allow the device 1105 to transmit, in a single control message, an indication of a beam update and an indication for configuring reference signals for measuring or synchronizing with a beam indicated in the beam update, thereby reducing processing overhead and latency for establishing communications using the new beam. As such, the communications manager 1120 may decrease signaling overhead for the device 1105, thereby saving power and decreasing signaling complexity. For example, the described techniques may allow the device 1105 to more efficiently indicate reference signals for synchronizing with a beam indicated in a beam update, thereby reducing the delay (e.g., also referred to herein as a warmup time) associated with therewith.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of control signaling for beam update and reference signals as described herein, or the processor 1140 and the memory 1130 may be otherwise configured to perform or support such operations.

Figure 12:
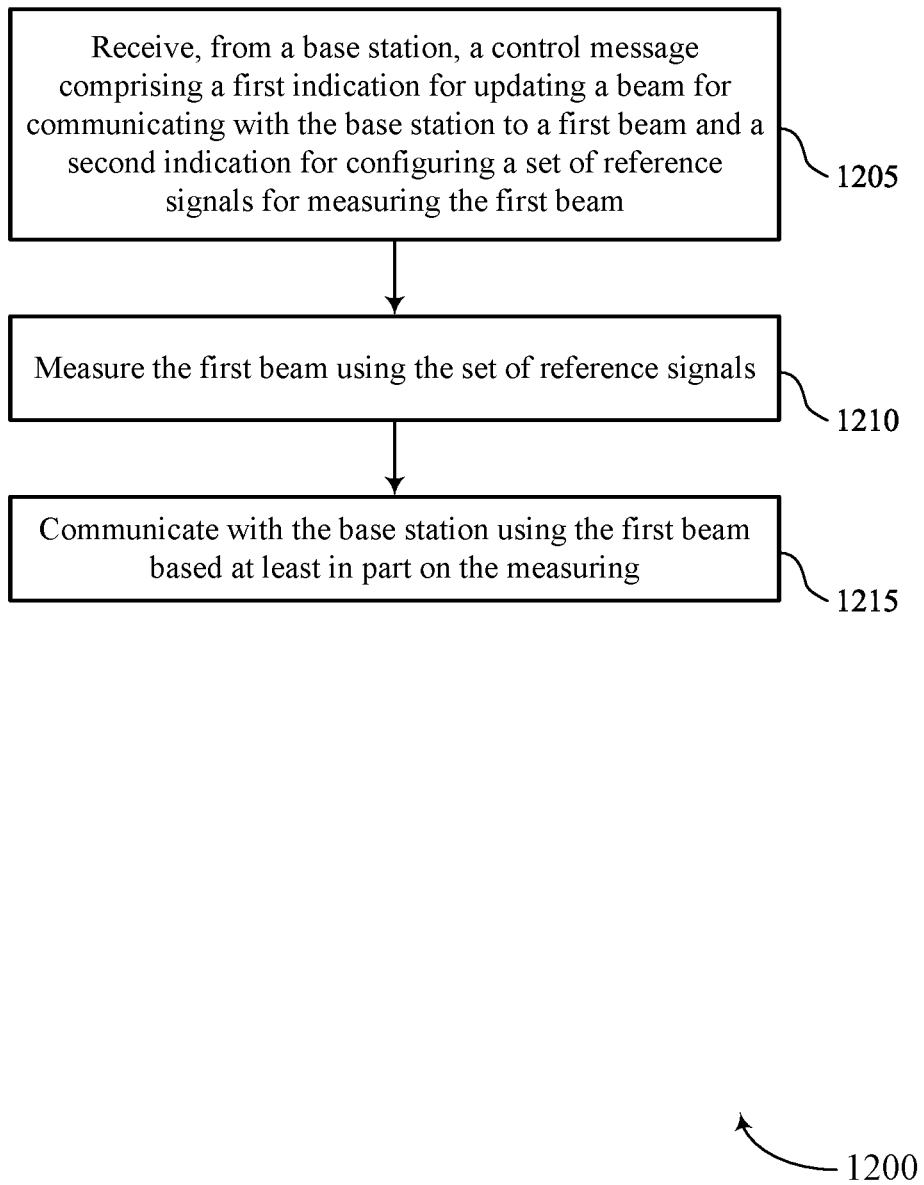
FIGS. 12 through 15 show flowcharts illustrating methods that support control signaling for beam update and reference signals in accordance with aspects of the present disclosure.

FIG. 12 shows a flowchart illustrating a method 1200 that supports control signaling for beam update and reference signals in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, a control message including a first indication for updating a beam for communicating with the base station to a first beam and a second indication for configuring a set of reference signals for measuring the first beam. The operations of 1205 may be performed in accordance with examples as disclosed herein. In some examples, aspects of the operations of 1205 may be performed by a control component 625 as described with reference to FIG. 6.

At 1210, the method may include measuring the first beam using the set of reference signals. The operations of 1210 may be performed in accordance with examples as disclosed herein. In some examples, aspects of the operations of 1210 may be performed by a measurement component 630 as described with reference to FIG. 6.

At 1215, the method may include communicating with the base station using the first beam based on the measuring. The operations of 1215 may be performed in accordance with examples as disclosed herein. In some examples, aspects of the operations of 1215 may be performed by a beam component 635 as described with reference to FIG. 6.

Figure 13:
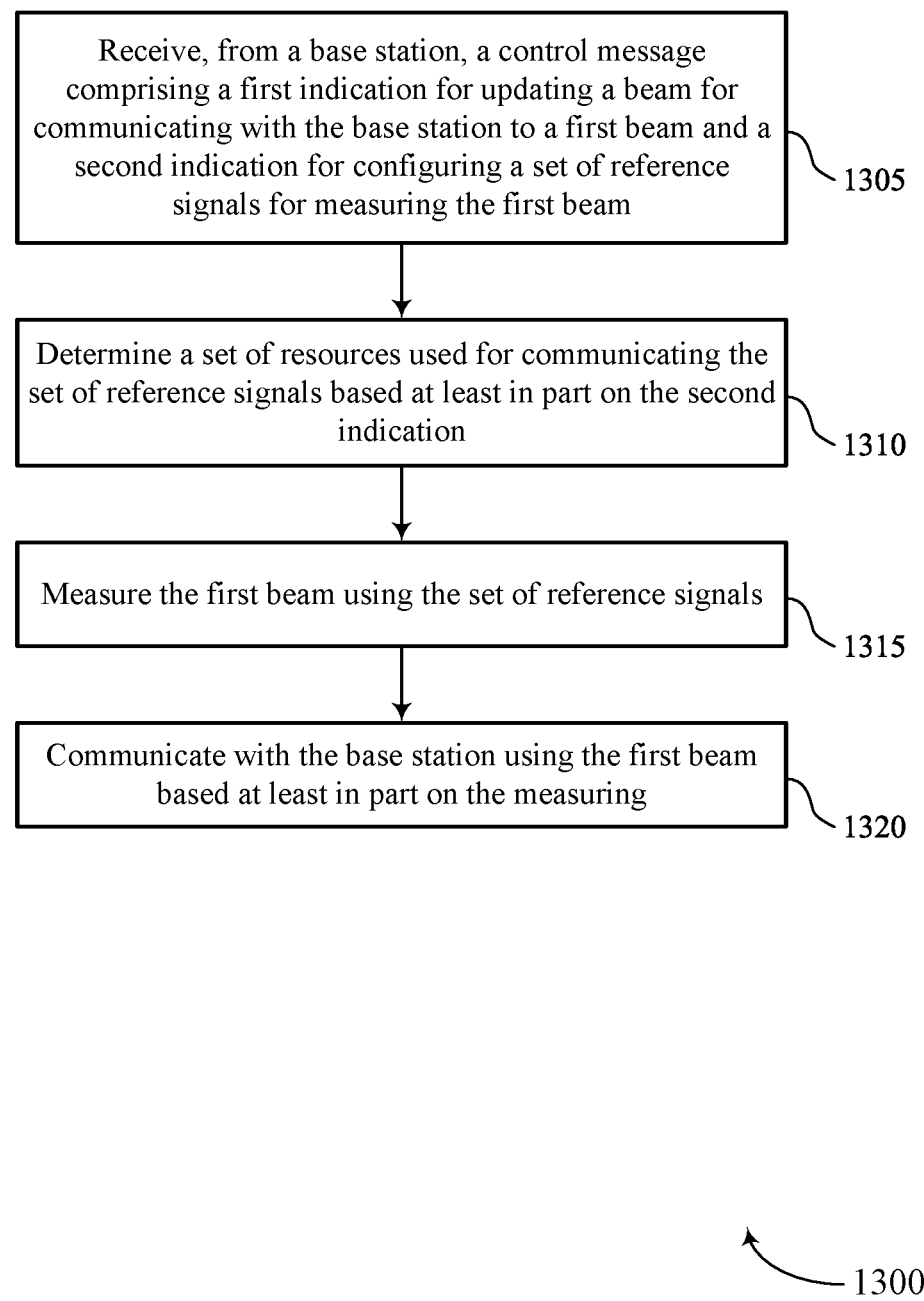

FIG. 13 shows a flowchart illustrating a method 1300 that supports control signaling for beam update and reference signals in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a control message including a first indication for updating a beam for communicating with the base station to a first beam and a second indication for configuring a set of reference signals for measuring the first beam. The operations of 1305 may be performed in accordance with examples as disclosed herein. In some examples, aspects of the operations of 1305 may be performed by a control component 625 as described with reference to FIG. 6.

At 1310, the method may include determining a set of resources used for communicating the set of reference signals based on the second indication. The operations of 1310 may be performed in accordance with examples as disclosed herein. In some examples, aspects of the operations of 1310 may be performed by a resource component 640 as described with reference to FIG. 6.

At 1315, the method may include measuring the first beam using the set of reference signals. The operations of 1315 may be performed in accordance with examples as disclosed herein. In some examples, aspects of the operations of 1315 may be performed by a measurement component 630 as described with reference to FIG. 6.

At 1320, the method may include communicating with the base station using the first beam based on the measuring. The operations of 1320 may be performed in accordance with examples as disclosed herein. In some examples, aspects of the operations of 1320 may be performed by a beam component 635 as described with reference to FIG. 6.

Figure 14:
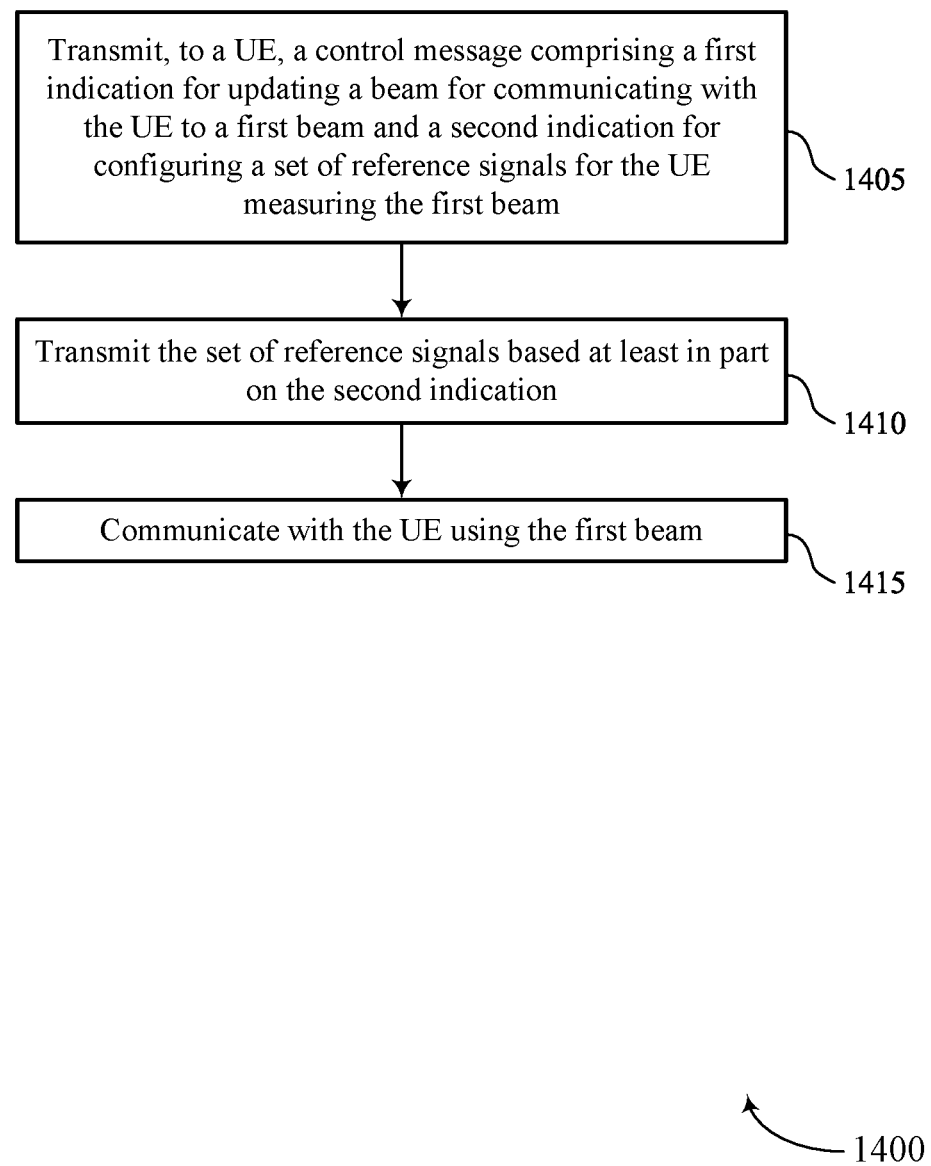

FIG. 14 shows a flowchart illustrating a method 1400 that supports control signaling for beam update and reference signals in accordance with aspects of the present disclosure. The operations of the method 1400 may be implemented by a base station or its components as described herein. For example, the operations of the method 1400 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1405, the method may include transmitting, to a UE, a control message including a first indication for updating a beam for communicating with the UE to a first beam and a second indication for configuring a set of reference signals for the UE measuring the first beam. The operations of 1405 may be performed in accordance with examples as disclosed herein. In some examples, aspects of the operations of 1405 may be performed by a control component 1025 as described with reference to FIG. 10.

At 1410, the method may include transmitting the set of reference signals based on the second indication. The operations of 1410 may be performed in accordance with examples as disclosed herein. In some examples, aspects of the operations of 1410 may be performed by a reference signal component 1030 as described with reference to FIG. 10.

At 1415, the method may include communicating with the UE using the first beam. The operations of 1415 may be performed in accordance with examples as disclosed herein. In some examples, aspects of the operations of 1415 may be performed by a beam component 1035 as described with reference to FIG. 10.

Figure 15:
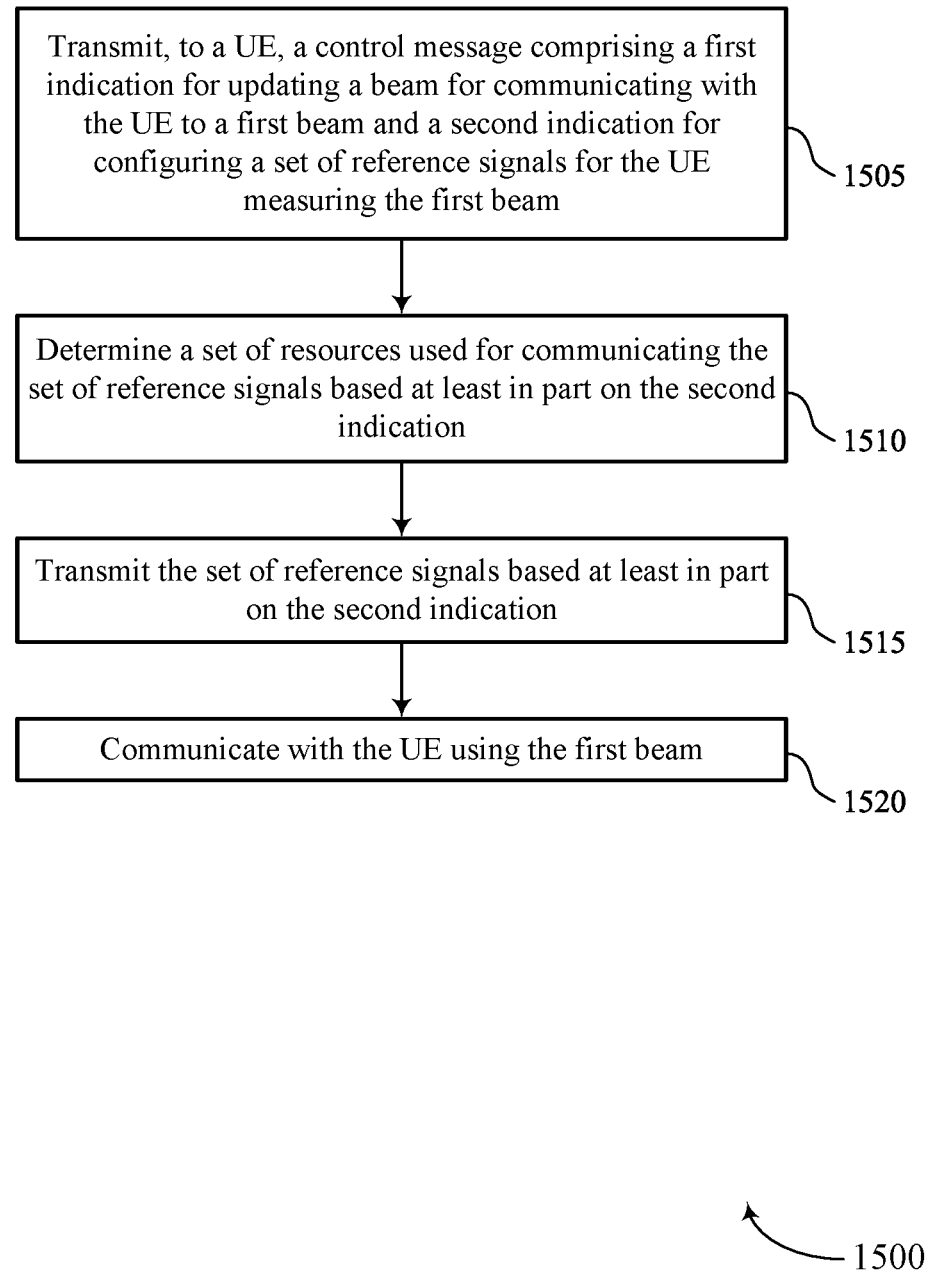

FIG. 15 shows a flowchart illustrating a method 1500 that supports control signaling for beam update and reference signals in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, a control message including a first indication for updating a beam for communicating with the UE to a first beam and a second indication for configuring a set of reference signals for the UE measuring the first beam. The operations of 1505 may be performed in accordance with examples as disclosed herein. In some examples, aspects of the operations of 1505 may be performed by a control component 1025 as described with reference to FIG. 10.

At 1510, the method may include determining a set of resources used for communicating the set of reference signals based on the second indication. The operations of 1510 may be performed in accordance with examples as disclosed herein. In some examples, aspects of the operations of 1510 may be performed by a resource component 1040 as described with reference to FIG. 10.

At 1515, the method may include transmitting the set of reference signals based on the second indication. The operations of 1515 may be performed in accordance with examples as disclosed herein. In some examples, aspects of the operations of 1515 may be performed by a reference signal component 1030 as described with reference to FIG. 10.

At 1520, the method may include communicating with the UE using the first beam. The operations of 1520 may be performed in accordance with examples as disclosed herein. In some examples, aspects of the operations of 1520 may be performed by a beam component 1035 as described with reference to FIG. 10.

The following provides an overview of aspects of the present disclosure:

Aspect 1: A method for wireless communication at a UE, comprising: receiving, from a base station, a control message comprising a first indication for updating a beam for communicating with the base station to a first beam and a second indication for configuring a set of reference signals for measuring the first beam; measuring the first beam using the set of reference signals; and communicating with the base station using the first beam based at least in part on the measuring.

Aspect 2: The method of aspect 1, wherein receiving the control message comprises: identifying a format of the control message for jointly indicating updating the beam and configuring the set of reference signals.

Aspect 3: The method of aspect 1, wherein receiving the control message comprises: identifying a format of the control message for scheduling uplink or downlink communications, and wherein at least a portion of the control message is configured for jointly indicating updating the beam and configuring the set of reference signals.

Aspect 4: The method of any of aspects 1 through 3, further comprising: determining a set of resources used for communicating the set of reference signals based at least in part on the second indication.

Aspect 5: The method of aspect 4, wherein the set of resources used for communicating the set of reference signals are non-synchronized with a set of raster resources associated with an initial access procedure between the UE and the base station.

Aspect 6: The method of aspect 4, wherein the set of resources used for communicating the set of reference signals are synchronized with a set of raster resources associated with an initial access procedure between the UE and the base station.

Aspect 7: The method of any of aspects 1 through 6, further comprising: determining, based at least in part on the second indication, a duration between a transmission of a feedback message by the UE in response to the control message and a transmission of the set of reference signals by the base station.

Aspect 8: The method of any of aspects 1 through 7, further comprising: determining, based at least in part on the second indication, a duration for communicating using the first beam with respect to the set of reference signals, wherein communicating with the base station using the first beam is based at least in part on the duration.

Aspect 9: The method of any of aspects 1 through 8, wherein the set of reference signals comprises a set of SSBs, a set of CSI-RSs, a set of tracking reference signals, or a combination thereof.

Aspect 10: The method of any of aspects 1 through 9, wherein the control message comprises a DCI message.

Aspect 11: The method of any of aspects 1 through 10, wherein the control message comprises a MAC-CE.

Aspect 12: A method for wireless communication at a base station, comprising: transmitting, to a UE, a control message comprising a first indication for updating a beam for communicating with the UE to a first beam and a second indication for configuring a set of reference signals for the UE measuring the first beam; transmitting the set of reference signals based at least in part on the second indication; and communicating with the UE using the first beam.

Aspect 13: The method of aspect 12, wherein transmitting the control message comprises: identifying a format of the control message for jointly indicating updating the beam and configuring the set of reference signals.

Aspect 14: The method of aspect 12, wherein transmitting the control message comprises: identifying a format of the control message for scheduling uplink or downlink communications, and wherein at least a portion of the control message is configured for jointly indicating updating the beam and configuring the set of reference signals.

Aspect 15: The method of any of aspects 12 through 14, further comprising: determining a set of resources used for communicating the set of reference signals based at least in part on the second indication.

Aspect 16: The method of aspect 15, wherein the set of resources used for communicating the set of reference signals are non-synchronized with a set of raster resources associated with an initial access procedure between the UE and the base station.

Aspect 17: The method of aspect 15, wherein the set of resources used for communicating the set of reference signals are synchronized with a set of raster resources associated with an initial access procedure between the UE and the base station.

Aspect 18: The method of any of aspects 12 through 17, further comprising: determining, based at least in part on the second indication, a duration between a transmission of a feedback message by the UE in response to the control message and a transmission of the set of reference signals by the base station.

Aspect 19: The method of any of aspects 12 through 18, further comprising: determining, based at least in part on the second indication, a duration for communicating using the first beam with respect to the set of reference signals, wherein communicating with the UE using the first beam is based at least in part on the duration.

Aspect 20: The method of any of aspects 12 through 19, wherein the set of reference signals comprises a set of SSBs, a set of CSI-RSs, a set of tracking reference signals, or a combination thereof.

Aspect 21: The method of any of aspects 12 through 20, wherein the control message comprises a DCI message.

Aspect 22: The method of any of aspects 12 through 20, wherein the control message comprises a MAC-CE.

Aspect 23: An apparatus for wireless communication at a UE, comprising a processor; memory coupled with the processor; and instructions stored in the memory and executable by the processor to cause the apparatus to perform a method of any of aspects 1 through 22.

Aspect 24: An apparatus for wireless communication at a UE, comprising at least one means for performing a method of any of aspects 1 through 22.

Aspect 25: A non-transitory computer-readable medium storing code for wireless communication at a UE, the code comprising instructions executable by a processor to perform a method of any of aspects 1 through 22.

Aspect 26: An apparatus for wireless communication at a base station, comprising a processor; memory coupled with the processor; and instructions stored in the memory and executable by the processor to cause the apparatus to perform a method of any of aspects 12 through 21.

Aspect 27: An apparatus for wireless communication at a base station, comprising at least one means for performing a method of any of aspects 12 through 21.

Aspect 28: A non-transitory computer-readable medium storing code for wireless communication at a base station, the code comprising instructions executable by a processor to perform a method of any of aspects 12 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving a control message that jointly indicates an updated beam to use for communication with a network entity and a configuration for a set of reference signals associated with the updated beam, wherein the control message indicates an amount of time between transmission of the set of reference signals and the communication using the updated beam;
    receiving, subsequent to the control message, the set of reference signals based at least in part on the configuration for the set of reference signals;
    synchronizing, prior to the communication using the updated beam and during the amount of time indicated by the control message, the updated beam based at least in part on the set of reference signals associated with the updated beam indicated by the control message; and
    communicating with the network entity using the updated beam subsequent to the amount of time based at least in part on synchronizing the updated beam.

2. The method of claim 1, wherein receiving the control message comprises:
    identifying a format of the control message for jointly indicating the updated beam and the configuration for the set of reference signals.

3. The method of claim 1, further comprising:
    determining a set of resources to monitor for the set of reference signals based at least in part on the control message.

4. The method of claim 3, wherein the set of resources are non-synchronized with a set of raster resources associated with an initial access procedure between the UE and the network entity.

5. The method of claim 3, wherein the set of resources are synchronized with a set of raster resources associated with an initial access procedure between the UE and the network entity.

6. The method of claim 1, further comprising:
    determining, based at least in part on the control message, a duration between transmission of a feedback message by the UE in response to the control message and transmission of the set of reference signals by the network entity.

7. The method of claim 1, wherein the amount of time indicates when the updated beam is ready for use following the transmission of the set of reference signals.

8. The method of claim 1, wherein the set of reference signals comprises a set of synchronization signal blocks (SSBs), a set of channel state information (CSI) reference signals (CSI-RSs), a set of tracking reference signals, or a combination thereof.

9. The method of claim 1, wherein the control message comprises a downlink control information (DCI) message.

10. The method of claim 1, wherein the control message comprises a media access control (MAC) control element (MAC-CE).

11. A method for wireless communication at a network entity, comprising:
transmitting a control message that jointly indicates an updated beam to use for communication with a user equipment (UE) and a configuration for a set of reference signals associated with the updated beam, wherein the control message indicates an amount of time between transmission of the set of reference signals and the communication using the updated beam;
transmitting, subsequent to transmitting the control message, the set of reference signals prior to the communication using the updated beam and during the amount of time indicated by the control message; and
communicating, subsequent to the amount of time, with the UE using the updated beam that is synchronized during the amount of time.

12. The method of claim 11, further comprising:
determining a set of resources to use for transmission of the set of reference signals, wherein the control message indicates the set of resources.

13. The method of claim 12, wherein the set of resources are non-synchronized with a set of raster resources associated with an initial access procedure between the UE and the network entity.

14. The method of claim 12, wherein the set of resources are synchronized with a set of raster resources associated with an initial access procedure between the UE and the network entity.

15. The method of claim 11, further comprising:
determining a duration between transmission of a feedback message by the UE in response to the control message and transmission of the set of reference signals by the network entity.

16. The method of claim 11, wherein the amount of time indicates when the updated beam is ready for use following the transmission of the set of reference signals.

17. The method of claim 11, wherein the set of reference signals comprises a set of synchronization signal blocks (SSBs), a set of channel state information (CSI) reference signals (CSI-RSs), a set of tracking reference signals, or a combination thereof.

18. The method of claim 11, wherein the control message comprises a downlink control information (DCI) message.

19. The method of claim 11, wherein the control message comprises a media access control (MAC) control element (MAC-CE).

20. An apparatus for wireless communication at a user equipment (UE), comprising:
at least one processor;
at least one memory coupled with the at least one processor; and
instructions stored in the at least one memory and executable by the at least one processor to cause the apparatus to:
receive a control message that jointly indicates an updated beam to use for communication with a network entity and a configuration for a set of reference signals associated with the updated beam, wherein the control message indicates an amount of time between transmission of the set of reference signals and the communication using the updated beam;
receive, subsequent to the control message, the set of reference signals based at least in part on the configuration for the set of reference signals;
synchronize, prior to the communication using the updated beam and during the amount of time indicated by the control message, the updated beam based at least in part on the set of reference signals associated with the updated beam indicated by the control message; and
communicate with the network entity using the updated beam subsequent to the amount of time based at least in part on synchronizing the updated beam.

21. The apparatus of claim 20, wherein the instructions to receive the control message are executable by the at least one processor to cause the apparatus to:
identify a format of the control message for jointly indicating the updated beam and the configuration for the set of reference signals.

22. The apparatus of claim 20, wherein the instructions are further executable by the at least one processor to cause the apparatus to:
determine a set of resources to monitor for the set of reference signals based at least in part on the control message.

23. The apparatus of claim 22, wherein the set of resources are non-synchronized with a set of raster resources associated with an initial access procedure between the UE and the network entity.

24. An apparatus for wireless communication at a network entity, comprising:
at least one processor;
at least one memory coupled with the at least one processor; and
instructions stored in the at least one memory and executable by the at least one processor to cause the apparatus to:
transmit a control message that jointly indicates an updated beam to use for communication with a user equipment (UE) and a configuration for a set of reference signals associated with the updated beam, wherein the control message indicates an amount of time between transmission of the set of reference signals and the communication using the updated beam;
transmit, subsequent to transmission of the control message, the set of reference signals prior to the communication using the updated beam and during the amount of time indicated by the control message; and
communicate, subsequent to the amount of time, with the UE using the updated beam that is synchronized during the amount of time.

* * * * *